United States Patent
Chen et al.

(10) Patent No.: US 9,998,757 B2
(45) Date of Patent: Jun. 12, 2018

(54) REFERENCE PICTURE SIGNALING AND DECODED PICTURE BUFFER MANAGEMENT

(71) Applicant: Velos Media, LLC, Plano, TX (US)

(72) Inventors: Ying Chen, San Diego, CA (US); Ye-Kui Wang, San Diego, CA (US)

(73) Assignee: Velos Media, LLC, Plano, TX (US)

( * ) Notice: Subject to any disclaimer, the term of this patent is extended or adjusted under 35 U.S.C. 154(b) by 396 days.

(21) Appl. No.: 13/623,768

(22) Filed: Sep. 20, 2012

(65) Prior Publication Data

US 2013/0077681 A1    Mar. 28, 2013

Related U.S. Application Data

(60) Provisional application No. 61/538,787, filed on Sep. 23, 2011, provisional application No. 61/539,433, (Continued)

(51) Int. Cl.
*H04N 19/44* (2014.01)
*H04N 19/58* (2014.01)
(Continued)

(52) U.S. Cl.
CPC ............... *H04N 19/58* (2014.11); *H04N 7/12* (2013.01); *H04N 19/105* (2014.11); (Continued)

(58) Field of Classification Search
CPC ........ H04N 7/46; H04N 19/70; H04N 19/597; H04N 19/30; H04N 19/172; H04N 19/176;
(Continued)

(56) References Cited

U.S. PATENT DOCUMENTS 7,149,247 B2    12/2006    Sullivan
7,253,831 B2    8/2007    Gu
(Continued)

FOREIGN PATENT DOCUMENTS

CN    1523892 A    8/2004
CN    1736103 A    2/2006
(Continued)

OTHER PUBLICATIONS

Hannuksela et al., "POC Issues," Joint Video Team (JVT) of ISO/IEC MPEG & ITU-T VCEG, 6th Meeting, Document: JVT-F044, Dec. 5-13, 2002, 10 pp.
(Continued)

*Primary Examiner* — Mohammed Rahaman
*Assistant Examiner* — Kehinde O Abimbola
(74) *Attorney, Agent, or Firm* — Nixon & Vanderhye P.C.

(57) ABSTRACT

Techniques are described related to performing random access starting from a random access point picture that is not an instantaneous decoder refresh picture. Some techniques are also related to reducing the amount of information that is signaled for long-term reference pictures of a reference picture set. Additional techniques are also related to decoded picture buffer management, such as removing decoded pictures based on a temporal identification value.

39 Claims, 8 Drawing Sheets

Related U.S. Application Data filed on Sep. 26, 2011, provisional application No. 61/542,034, filed on Sep. 30, 2011.

(51) Int. Cl.

| | | |
|---|---|---|
| *H04N 7/12* | (2006.01) | |
| *H04N 19/105* | (2014.01) | |
| *H04N 19/176* | (2014.01) | |
| *H04N 19/70* | (2014.01) | |
| *H04N 19/463* | (2014.01) | |
| *H04N 19/174* | (2014.01) | |
| *H04N 19/50* | (2014.01) | |

(52) U.S. Cl.
CPC ......... *H04N 19/174* (2014.11); *H04N 19/176* (2014.11); *H04N 19/463* (2014.11); *H04N 19/50* (2014.11); *H04N 19/70* (2014.11)

(58) Field of Classification Search
CPC ....... H04N 2201/0094; H04N 13/0022; H04N 19/174; H04N 19/593; H04N 5/23212; H04N 19/124; H04N 19/186; H04N 19/44; H04N 1/6008; H04N 19/187; H04N 19/31; H04N 19/46; H04N 13/0048; H04N 19/107; H04N 19/61; H04N 19/159; H04N 19/188
See application file for complete search history.

(56) References Cited

U.S. PATENT DOCUMENTS

| | | | |
|---|---|---|---|
| 7,430,361 B2 | 9/2008 | Roelens | |
| 7,492,387 B2 | 2/2009 | Yang et al. | |
| 7,495,587 B2 * | 2/2009 | Bae ................. | G11C 7/02 341/50 |
| 7,782,903 B2 * | 8/2010 | Yousef ............. | H04L 1/0052 370/469 |
| 7,782,950 B2 | 8/2010 | Jeon et al. | |
| 7,801,223 B2 | 9/2010 | Winger | |
| 7,869,501 B2 | 1/2011 | Park et al. | |
| 8,036,272 B2 | 10/2011 | Suzuki | |
| 8,050,328 B2 | 11/2011 | Iguchi et al. | |
| 8,073,059 B2 | 12/2011 | Lim et al. | |
| 8,170,116 B2 | 5/2012 | Wang et al. | |
| 8,175,154 B2 | 5/2012 | Luthra | |
| 8,194,741 B2 | 6/2012 | Yang et al. | |
| 8,194,751 B2 | 6/2012 | Notoya et al. | |
| 8,204,134 B2 | 6/2012 | Hannuksela | |
| 8,340,510 B2 * | 12/2012 | Wu .................. | H04N 5/783 386/343 |
| 8,345,743 B2 | 1/2013 | Shi .................. | H04N 21/23424 375/240.02 |
| 8,494,049 B2 | 7/2013 | Buttimer et al. | |
| 8,582,649 B2 | 11/2013 | Nakaishi et al. | |
| 8,599,925 B2 | 12/2013 | Srinivasan | |
| 8,611,412 B2 | 12/2013 | Ying et al. | |
| 8,693,539 B2 | 4/2014 | Lim et al. | |
| 8,781,003 B2 | 7/2014 | Beheydt et al. | |
| 8,886,022 B2 * | 11/2014 | Rodriguez ........ | H04N 5/76 386/343 |
| 9,106,927 B2 | 8/2015 | Wang et al. | |
| 9,131,245 B2 | 9/2015 | Chen et al. | |
| 9,185,427 B2 | 11/2015 | Tourapis et al. | |
| 9,264,717 B2 | 2/2016 | Chen et al. | |
| 2004/0120345 A1 | 6/2004 | Yamaguchi et al. | |
| 2004/0161033 A1 | 8/2004 | Notoya et al. | |
| 2004/0190606 A1 | 9/2004 | Deshpande | |
| 2004/0218668 A1 | 11/2004 | Hannuksela et al. | |
| 2004/0218676 A1 | 11/2004 | Ha et al. | |
| 2005/0123056 A1 | 6/2005 | Wang et al. | |
| 2005/0201471 A1 | 9/2005 | Hannuksela et al. | |
| 2006/0013318 A1 | 1/2006 | Webb et al. | |
| 2006/0062302 A1 | 3/2006 | Yin et al. | |
| 2006/0083298 A1 | 4/2006 | Wang et al. | |
| 2006/0294171 A1 | 12/2006 | Bossen et al. | |
| 2007/0028087 A1 | 2/2007 | Yu et al. | |
| 2007/0086521 A1 | 4/2007 | Wang et al. | |
| 2007/0168644 A1 | 7/2007 | Hummel et al. | |
| 2007/0183494 A1 | 8/2007 | Hannuksela | |
| 2007/0183499 A1 | 8/2007 | Kimata et al. | |
| 2007/0189626 A1 | 8/2007 | Tanizawa et al. | |
| 2007/0206673 A1 | 9/2007 | Cipolli et al. | |
| 2007/0242508 A1 * | 10/2007 | Bae .................. | G11C 7/02 365/184 |
| 2007/0247549 A1 | 10/2007 | Jeong et al. | |
| 2007/0286283 A1 | 12/2007 | Yin et al. | |
| 2008/0002770 A1 | 1/2008 | Ugur et al. | |
| 2008/0025396 A1 | 1/2008 | Tasaka et al. | |
| 2008/0089597 A1 | 4/2008 | Guo et al. | |
| 2008/0101478 A1 | 5/2008 | Kusunoki | |
| 2008/0112485 A1 | 5/2008 | Adachi et al. | |
| 2008/0117985 A1 | 5/2008 | Chen et al. | |
| 2008/0137742 A1 | 6/2008 | Chen et al. | |
| 2008/0165860 A1 | 7/2008 | Sahraoui et al. | |
| 2008/0170564 A1 * | 7/2008 | Shi .................. | H04N 21/23424 370/386 |
| 2008/0232467 A1 | 9/2008 | Iguchi et al. | |
| 2008/0260034 A1 | 10/2008 | Wang et al. | |
| 2008/0260045 A1 * | 10/2008 | Rodriguez ........ | H04N 21/23614 375/240.26 |
| 2008/0268877 A1 | 10/2008 | Harris | |
| 2008/0301742 A1 | 12/2008 | Hannuksela et al. | |
| 2008/0317138 A1 | 12/2008 | Jia | |
| 2009/0003445 A1 | 1/2009 | Ying et al. | |
| 2009/0003447 A1 | 1/2009 | Christoffersen et al. | |
| 2009/0052858 A1 | 2/2009 | Date et al. | |
| 2009/0080533 A1 | 3/2009 | Folta et al. | |
| 2009/0148132 A1 * | 6/2009 | Rodriguez ........ | H04N 19/30 386/248 |
| 2009/0150620 A1 | 6/2009 | Paver et al. | |
| 2009/0168805 A1 | 7/2009 | Sullivan et al. | |
| 2009/0168886 A1 | 7/2009 | Ikeda et al. | |
| 2009/0191874 A1 | 7/2009 | Du et al. | |
| 2009/0214178 A1 | 8/2009 | Takahashi | |
| 2009/0220010 A1 | 9/2009 | Park et al. | |
| 2009/0220011 A1 | 9/2009 | Kursawe et al. | |
| 2009/0238261 A1 | 9/2009 | Bhavani et al. | |
| 2009/0238269 A1 | 9/2009 | Pandit et al. | |
| 2009/0257497 A1 | 10/2009 | Kazui | |
| 2009/0262804 A1 | 10/2009 | Pandit et al. | |
| 2009/0264126 A1 | 10/2009 | Khetawat et al. | |
| 2009/0279608 A1 | 11/2009 | Jeon et al. | |
| 2009/0285096 A1 * | 11/2009 | Yousef ............. | H04L 1/0052 370/235 |
| 2009/0296811 A1 | 12/2009 | Jeon et al. | |
| 2009/0297051 A1 | 12/2009 | Nonaka et al. | |
| 2009/0304068 A1 | 12/2009 | Pandit et al. | |
| 2009/0310934 A1 * | 12/2009 | Rodriguez ........ | H04N 5/76 386/343 |
| 2010/0020870 A1 | 1/2010 | Jeon et al. | |
| 2010/0004661 A1 | 2/2010 | Koo et al. | |
| 2010/0074340 A1 | 3/2010 | Luo et al. | |
| 2010/0091845 A1 | 4/2010 | Jeon et al. | |
| 2010/0118933 A1 | 5/2010 | Pandit et al. | |
| 2010/0135385 A1 | 6/2010 | Park et al. | |
| 2010/0158120 A1 | 6/2010 | Fang et al. | |
| 2010/0189173 A1 | 7/2010 | Chen et al. | |
| 2010/0189182 A1 * | 7/2010 | Hannuksela ...... | H04N 21/234327 375/240.25 |
| 2010/0215338 A1 * | 8/2010 | Rodriguez ........ | H04N 5/76 386/343 |
| 2010/0232520 A1 | 9/2010 | Wu et al. | |
| 2010/0238822 A1 | 9/2010 | Koyabu et al. | |
| 2010/0246662 A1 | 9/2010 | Koto et al. | |
| 2010/0262711 A1 * | 10/2010 | Bouazizi ........... | H04L 65/4084 709/231 |
| 2010/0266042 A1 | 10/2010 | Koo et al. | |
| 2010/0316121 A1 | 12/2010 | Tsai et al. | |
| 2011/0013889 A1 * | 1/2011 | Wu .................. | H04N 5/783 386/356 |
| 2011/0032999 A1 | 2/2011 | Chen et al. | |

(56) References Cited

U.S. PATENT DOCUMENTS

| | | | |
|---|---|---|---|
| 2011/0063409 A1* | 3/2011 | Hannuksela | H04N 19/597 348/42 |
| 2011/0078700 A1* | 3/2011 | Blackburn | G06F 9/505 718/105 |
| 2011/0080949 A1 | 4/2011 | Takahashi et al. | |
| 2011/0090957 A1 | 4/2011 | Liao et al. | |
| 2011/0096835 A1 | 4/2011 | Lim et al. | |
| 2011/0110418 A1 | 5/2011 | Lu et al. | |
| 2011/0142130 A1 | 6/2011 | Lin et al. | |
| 2011/0200112 A1 | 8/2011 | Won et al. | |
| 2011/0216836 A1 | 9/2011 | Luo et al. | |
| 2011/0222492 A1 | 9/2011 | Borsella et al. | |
| 2011/0222527 A1 | 9/2011 | Hole et al. | |
| 2011/0246659 A1* | 10/2011 | Bouazizi | H04N 21/2343 709/231 |
| 2011/0320196 A1 | 12/2011 | Choo et al. | |
| 2012/0069903 A1 | 3/2012 | Lim et al. | |
| 2012/0121015 A1 | 5/2012 | Yang | |
| 2012/0185570 A1* | 7/2012 | Bouazizi | H04N 21/44016 709/219 |
| 2012/0213492 A1 | 8/2012 | Takeuchi | |
| 2012/0230401 A1 | 9/2012 | Chen et al. | |
| 2012/0230409 A1 | 9/2012 | Chen et al. | |
| 2012/0230433 A1 | 9/2012 | Chen et al. | |
| 2012/0320984 A1 | 12/2012 | Zhou | |
| 2013/0044813 A1 | 2/2013 | Boon et al. | |
| 2013/0064284 A1* | 3/2013 | Samuelsson | H04N 19/70 375/240.01 |
| 2013/0077678 A1 | 3/2013 | Chen et al. | |
| 2013/0077679 A1 | 3/2013 | Wang et al. | |
| 2013/0077680 A1 | 3/2013 | Wang et al. | |
| 2013/0077681 A1 | 3/2013 | Chen et al. | |
| 2013/0077685 A1 | 3/2013 | Chen et al. | |
| 2013/0077687 A1 | 3/2013 | Wang et al. | |
| 2013/0107953 A1 | 5/2013 | Chen et al. | |
| 2013/0215975 A1* | 8/2013 | Samuelsson | H04N 19/70 375/240.25 |
| 2013/0235152 A1 | 9/2013 | Hannuksela et al. | |
| 2014/0023145 A1* | 1/2014 | Rodriguez | H04N 19/423 375/240.25 |
| 2014/0126640 A1* | 5/2014 | Samuelsson | H04N 19/70 375/240.16 |
| 2014/0146885 A1 | 5/2014 | Park et al. | |
| 2014/0233647 A1 | 8/2014 | Hendry et al. | |
| 2014/0241435 A1 | 8/2014 | Park et al. | |
| 2017/0041633 A1* | 2/2017 | Samuelsson | H04N 19/70 |

FOREIGN PATENT DOCUMENTS

| | | |
|---|---|---|
| CN | 101065780 A | 10/2007 |
| CN | 101102511 A | 1/2008 |
| CN | 101115208 A | 1/2008 |
| CN | 101317459 A | 12/2008 |
| CN | 101356822 A | 1/2009 |
| CN | 101444104 A | 5/2009 |
| CN | 101461242 A | 6/2009 |
| CN | 101536523 A | 9/2009 |
| CN | 101547368 | 9/2009 |
| CN | 101548550 A | 9/2009 |
| CN | 101572817 A | 11/2009 |
| CN | 101594535 A | 12/2009 |
| CN | 101653001 | 2/2010 |
| CN | 101690202 A | 3/2010 |
| CN | 101888553 A | 11/2010 |
| CN | 102045557 A | 5/2011 |
| CN | 102104781 A | 6/2011 |
| EP | 2099228 A2 | 9/2009 |
| EP | 2285115 A2 | 2/2011 |
| JP | 2004274732 A | 9/2004 |
| JP | 2005516496 A | 6/2005 |
| JP | 2006519517 A | 8/2006 |
| JP | 2007067842 A | 3/2007 |
| JP | 2007184791 | 7/2007 |
| JP | 2007184791 A | 7/2007 |
| JP | 2008219204 A | 9/2008 |
| JP | 2009060402 A | 3/2009 |
| JP | 2009512306 A | 3/2009 |
| JP | 2009260736 A | 11/2009 |
| JP | 2009290389 A | 12/2009 |
| JP | 2009296078 A | 12/2009 |
| JP | 2009543508 A | 12/2009 |
| JP | 2010516103 | 5/2010 |
| JP | 2010219983 A | 9/2010 |
| KR | 1020060081970 A | 7/2006 |
| KR | 20080041972 A | 5/2008 |
| KR | 20080066784 A | 7/2008 |
| RU | 2310231 C2 | 11/2007 |
| RU | 2326505 C2 | 6/2008 |
| RU | 2402886 C2 | 10/2010 |
| RU | 2009119523 A | 11/2010 |
| RU | 2406253 C2 | 12/2010 |
| RU | 2409006 C1 | 1/2011 |
| RU | 2414092 C2 | 3/2011 |
| RU | 2414093 C2 | 3/2011 |
| RU | 2417518 C2 | 4/2011 |
| RU | 2420915 C2 | 6/2011 |
| RU | 2443074 C2 | 2/2012 |
| TW | 200829034 A | 7/2008 |
| WO | 03063500 A1 | 7/2003 |
| WO | 2004088988 A1 | 10/2004 |
| WO | 2006044370 A1 | 4/2006 |
| WO | 2006075635 A1 | 7/2006 |
| WO | 2007018669 A1 | 2/2007 |
| WO | 2007081752 A2 | 7/2007 |
| WO | 2007094100 A1 | 8/2007 |
| WO | 2007114612 A1 | 10/2007 |
| WO | 2008004137 A1 | 1/2008 |
| WO | 2008005574 A2 | 1/2008 |
| WO | 2008007913 A1 | 1/2008 |
| WO | 2008047304 A1 | 4/2008 |
| WO | 2008047316 A1 | 4/2008 |
| WO | 2008051380 A2 | 5/2008 |
| WO | 2008061164 A2 | 5/2008 |
| WO | 2008085935 A1 | 7/2008 |
| WO | 2009073826 A1 | 6/2009 |
| WO | 2009130561 A1 | 10/2009 |
| WO | 2010109904 A1 | 9/2010 |
| WO | 2011054879 A2 | 5/2011 |
| WO | 2013002700 A1 | 1/2013 |

OTHER PUBLICATIONS

Hannuksela et al., "Signaling of "Clean" Random Access Positions," Joint Video Team (JVT) of ISO/IEC MPEG & ITU-T VCEG, 3rd Meeting, Document: JVT-C083, May 6-10, 2002, 6 pp.

Chen, et al., "Conforming bitstreams starlings with CRA pictures", Joint Collaborative Team on Video Coding (JCT-VC) of ITU-T SG16 WP3 and ISO/IECJTC1/SC29/WG11, Nov. 21-30, 2011; 7th Meeting: Geneva, CH, Nov. 9, 2011, JCTVC-G319, 7 pp.

Wiegand, "Study of Final Committee Draft of Joint Video Specification ITU-T Rec. H.264, ISO/IEC 14496-10 AVC," Awaji MPEG Meeting, Dec. 5-13, 2002, 222 pp.

EP Communication dated Oct. 27, 2017 in EP Application 12772610.7.

EP Communication mailed Dec. 11, 2017 in EP Application 12772609.9.

Sjöberg et al., "Absolute signaling of reference pictures", Joint Collaborative Team on Video Coding (JCT-VC) of ITU-T SG16 WP3 and ISO/IEC JTC1/SC29/WG11, Document: JCTVC-F493, WG11 No. m20923, 6$^{th}$ Meeting: Torino, 2011.

Sjöberg et al., "JCTVC-F493: Proposed Changes to the HEVC Working Draft", Jul. 9, 2011 (Jul. 9, 2011), X0055054084—retrieved from the internet: phenix.int-evry.fr/jct/index.php.

Wiegand et al, "WD3: Working Draft 3 of High-Efficiency Video Coding", Joint Collaborative Team on Video Coding (JCT-VC) of ITU-T SG16 WP3 and ISO/IEC JTC1/SC29/WG11, Document: JCTVC-E603, 5$^{th}$ Meeting: Geneva, CH, Mar. 16-23, 2011.

Wahadaniah et al, "AHG21: Construction and modification of predefined reference picture sets and reference picture lists", Joint Collaborative Team on Video Coding (JCT-VC) of ITU-T SG16

(56) References Cited

OTHER PUBLICATIONS

WP3 and ISO/IEC JTC1/SC29/WG11, Document: JCTVC-G548, 7th Meeting: Geneva, CH, Nov. 21-30, 2011.
Wang et al, "AHG21: On DPB management", Joint Collaborative Team on Video Coding (JCT-VC) of ITU-T SG16 WP3 and ISO/IEC JTC1/SC29/WG11, Document: JCTVC-G314, 7th Meeting: Geneva, CH, Nov. 21-30, 2011.
Sjöberg et al., "AHG21: Long-term pictures and pruning of reference picture sets", Joint Collaborative Team on Video Coding (JCT-VC) of ITU-T SG16 WP3 and ISO/IEC JTC1/SC29/WG11, Document: JCTVC-G637, 7th Meeting: Geneva, CH, Nov. 21-30, 2011.
Bross et al., "WD4: Working Draft 4 of High-Efficiency Video Coding," 6th Meeting: JCTVC-F803_d6, Torino, IT, Jul. 14-22, 2011, 229 pp. Uploaded in 2 parts.
English translation of Japanese Office Action dated Aug. 1, 2017 in JP application 2016-134912.
Chen Y. et al., "Conforming bitstreams starting with CRA pictures," Joint Collaborative Team on Video Coding (JCT-VC) of ITU-T SG16 WP3 and ISO/IECJTC1/SC29/WG11, 7th Meeting: Geneva, CH, Nov. 21-30, 2011, JCTVC-G319, 7 pp.
Hsu et al., "Unified Syntax of Reference Picture List Reordering," Joint Collaborative Team on Video Coding (JCT-VC) of ITU-T SG16 WP3 and ISO/IEC JTC1/SC29/WG11, 5th Meeting: Geneva, CH, Mar. 23, 2011, [JCTVC-E053], 4 pp.
Wang et al., "On CDR Picture," Joint Collaborative Team on Video Coding (JCT-VC) of ITU-T SG16 WP3 and ISO/IEC JTC1/SC29/WG11 6th Meeting: Torino, IT, Jul. 1, 2011, JCTVC-F464, 4 pp.
Wang et al., "On reference picture marking," Joint Collaborative Team on Video Coding (JCT-VC) of ITU-T SG16 WP3 and ISO/IEC JTC1/SC29/WG11, 6th Meeting: Torino, IT, Jul. 22, 2011, [JCTVC-F462], 3 pp.
Wang et al., "POC Recovery in Random Access Point SEI Message," Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 13, 2002, JCT-F050, 6 pp.
Wang et al., "AHG21: On DPB management," Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G314, 8 pp.
Wiegand, "Editor's Proposed Draft Text Modifications for Joint Video Specification," (ITU-T Rec. H.264 | ISO/IEC 14496-10 AVC), Geneva modifications draft 37, Joint Video Team (JVT) of ISO/IEC MPEG and ITU-T VCEG 5th Meeting: Geneva, Switzerland, Oct. 17, 2002, JVT-E146d37, pp. i, 57-63.
Hsu C.W., et al., Unified Syntax of Reference Picture List Reordering, Joint Collaborative Team on Video Coding (JCT-VC) of ITU-T SG16 WP3 and ISO/IEC JTC1/SC29/WG11 5th Meeting: Geneva, CH, Mar. 23, 2011, [JCTVC-E053], pp. 1-4.
ITU-T H.265, Series H: Audiovisual and Multimedia Systems, Infrastructure of audiovisual services—Coding of moving video, High efficiency video coding, The International Telecommunication Union, Oct. 2014, 540 pp.
Wang Y.K., et al., On reference picture marking, Joint Collaborative Team on Video Coding (JCT-VC) of ITU-T SG16 WP3 and ISO/IEC JTC1/SC29/WG11 6th Meeting: Torino, IT, Jul. 22, 2011, [JCTVC-F462], pp. 1-3.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sjoberg et al., "Absolute signaling of reference pictures," 6th Meeting: Torino, IT, Jul. 2011, Document: JCTVC-F493, 15 pp.
Wenger et al., "Adaptation Parameter Set (APS)," JCTVC-F747r3, 6th Meeting: Torino, IT, Jul. 14-22, 2011, 10 pp.
U.S. Appl. No. 13/622,928, by Ye-Kui Wang, filed Sep. 19, 2012.
U.S. Appl. No. 13/622,961, by Ye-Kui Wang, filed Sep. 19, 2012.
U.S. Appl. No. 13/622,929, by Ye-Kui Wang, filed Sep. 19, 2012.
U.S. Appl. No. 13/622,944, by Ying Chen, filed Sep. 19, 2012.
U.S. Appl. No. 13/622,931, by Ying Chen, filed Sep. 19, 2012.
U.S. Appl. No. 13/622,972, by Ye-Kui Wang, filed Sep. 19, 2012.
U.S. Appl. No. 13/664,279, by Ying Chen, filed Oct. 30, 2012.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
International Preliminary Report on Patentability from International Application No. PCT/US2012/056638, dated Apr. 3, 2014, 9 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Flynn, et al., "JCT-VC AHG report: Reference picture buffering and list construction (AHG21)", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G021, XP030110020, 9 pp.
Hannuksela et al., "AHG21: On reference picture list construction and reference picture marking", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G643, XP030110627, 10 pp.
Hannuksela "Signaling of clean Random Access Positions", Joint Video Team (JVT) of ISO/IEC MPEG & ITU-T VCEG (ISO/IEC JTC1/SC29/WG11 and ITU-T SG16 Q6), May 2, 2002 (May 2, 2002), XP002264575, 6 pp.
Hannuksela "POC Issues", JVT Meeting; 63. MPEG Meeting; Sep. 12, 2002-Dec. 13, 2002; AWAJI, JP; (Joint Video Team of ISO/IEC JTC1/SC29/WG11 and ITU-T SG.16), No. JVT-F044, XP030005614, 10 pp.
International Search Report and Written Opinion—PCT/US2012/056638—ISA/EPO—dated Jul. 23, 2013, 13 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Shen et al., "Buffer requirement analysis and reference picture marking for temporal scalable video coding", Packet Video, Nov. 1, 2007, IEEE, XP031170603, ISBN: 978-1-4244-0980-8, pp. 91-97.
Sjöberg et al., "Proposed changes to the HEVC Working Draft," Joint Collaborative Team on Video Coding, attachment to JCTVC-F493, Jul. 14-22, 2011, 28 pp.
Sjöberg et al., "AHG21: Long-term pictures and pruning of reference picture sets, JCT-VC Meeting; MPEG Meeting; Nov. 21, 2011-Nov. 30, 2011; Geneva; (Joint Collaborative Team on Video

(56) References Cited

OTHER PUBLICATIONS

Coding of ISO/IEC JTC1/SC29/WG11 and ITU-T SG.16); URL: http://wftp3.itu.int/av-arch/jctvc-site/" No. JCTVC-G637, XP030110621, 3 pp.

Tan et al., "Clean Decoding Refresh Definition and Decoding Process", JCT-VC Meeting; MPEG Meeting; Jul. 14, 2011-Jul. 22, 2011; Torino; (Joint Colloborative Team on Video Coding of ISO/IEC JTC1/SC29/WG11 and ITU-T SG.16); URL : http://wftp3.itu.int/av-arch/jctvc-site/, No. JCTVC-F381, XP030009404, 3 pp.

Wahadaniah et al., "AHG21: Construction and modification of predefined reference picture sets and reference picture lists", JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G548, XP030110532, 21 pp.

Wang et al., "AHG21: On DPB management", MPEG Meeting; Nov. 28, 2011-Dec. 2, 2011; Geneva; (Motion Picture Expert Group or ISO/IEC JTC1/SC29/WG11), No. JCTVC-G314, XP030050439, 7 pp.

Wang et al., "On reference picture list construction", 95. MPEG Meeting; Jan. 24, 2011-Jan. 28, 2011; DAEGU; (Motion Picture Expert Group or ISO/IEC JTC1/SC29/WG11), No. JCTVC-D081, XP030047400, 3 pp.

Webb, "HRD Conformance for Real-time H.264 Video Encoding", Image Processing, 2007. ICIP 2007. IEEE International Conference on, IEEE, PI, pp. V-305-V-308, XP031158546, ISBN: 978-1-4244-1436-9.

\* cited by examiner

REFERENCE PICTURE SIGNALING AND DECODED PICTURE BUFFER MANAGEMENT

This application claims the benefit of:

U.S. Provisional Application No. 61/538,787, filed Sep. 23, 2011;

U.S. Provisional Patent Application No. 61/539,433, filed on Sep. 26, 2011; and

U.S. Provisional Patent Application No. 61/542,034, filed on Sep. 30, 2011, the entire contents each of which is incorporated by reference in its entirety.

TECHNICAL FIELD

This disclosure relates to video coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to the manner in which video coders determine identifiers for certain reference pictures. The techniques are also related to the manner in which the video coders determine whether certain types of reference pictures are to be used for inter-prediction of a current picture. Furthermore, the techniques are related to determining which pictures stored in a picture buffer can be removed.

For instance, in some examples, a video encoder may signal in the coded bitstream of video data and a video decoder may receive in the coded bitstream of video data a full identifier value for a random access point (RAP) reference picture that is not an instantaneous decoder refresh picture. This may allow the video encoder to signal in the coded bitstream of video data and the video decoder to receive in the coded bitstream of video data partial identifier values for reference pictures following the non-IDR RAP reference picture in decoding order. From the partial identifier values for such reference pictures and the full identifier value for the non-IDR RAP reference picture, the video decoder may determine the full identifier values for the reference pictures that follow the non-IDR RAP reference picture is decoding order.

In some examples, the video encoder may signal in the coded bitstream of video data and the video decoder may receive in the coded bitstream of video data values that indicate whether a certain type of reference pictures are used for inter-prediction coding. If the values indicate that the certain type of reference pictures are not needed for inter-prediction, then the video encoder may not need to signal and the video decoder may not need to receive identifier values for reference pictures of the certain type.

The video encoder and video decoder may be configured to store decoded pictures in a picture buffer referred to as a decoded picture buffer. The video encoder and video decoder may remove pictures stored in the decoded picture buffer to free space. In some examples, the video encoder and video decoder may determine which pictures should be removed from the decoded picture buffer based on temporal identification values of the pictures stored in the decoded picture buffer.

In one example, this disclosure describes a method for coding video data. The method includes coding a full identifier value for a random access point (RAP) picture that is not an instantaneous decoder refresh (IDR) picture, and coding a partial identifier value for a non-RAP picture based on the full identifier value for the RAP picture. In this example, the partial identifier value represents a portion of a full identifier value for the non-RAP picture.

In one example, this disclosure describes a device for coding video data. The device includes a video coder configured to code a full identifier value for a random access point (RAP) picture that is not an instantaneous decoder refresh (IDR) picture, and code a partial identifier value for a non-RAP picture based on the full identifier value for the RAP picture. In this example, the partial identifier value represents a portion of a full identifier value for the non-RAP picture.

In one example, this disclosure describes a computer-readable storage medium having stored thereon instructions that, when executed, cause a processor of a device for coding video data to code a full identifier value for a random access point (RAP) picture that is not an instantaneous decoder refresh (IDR) picture, and code a partial identifier value for a non-RAP picture based on the full identifier value for the RAP picture. In this example, the partial identifier value represents a portion of a full identifier value for the non-RAP picture.

In one example, this disclosure describes a device for coding video data. The device includes means for coding a full identifier value for a random access point (RAP) picture that is not an instantaneous decoder refresh (IDR) picture, and means for coding a partial identifier value for a non-RAP picture based on the full identifier value for the RAP picture. In this example, the partial identifier value represents a portion of a full identifier value for the non-RAP picture.

The details of one or more examples are set forth in the accompanying drawings and the description below. Other features, objects, and advantages will be apparent from the description and drawings, and from the claims.

DETAILED DESCRIPTION

Figure 1:
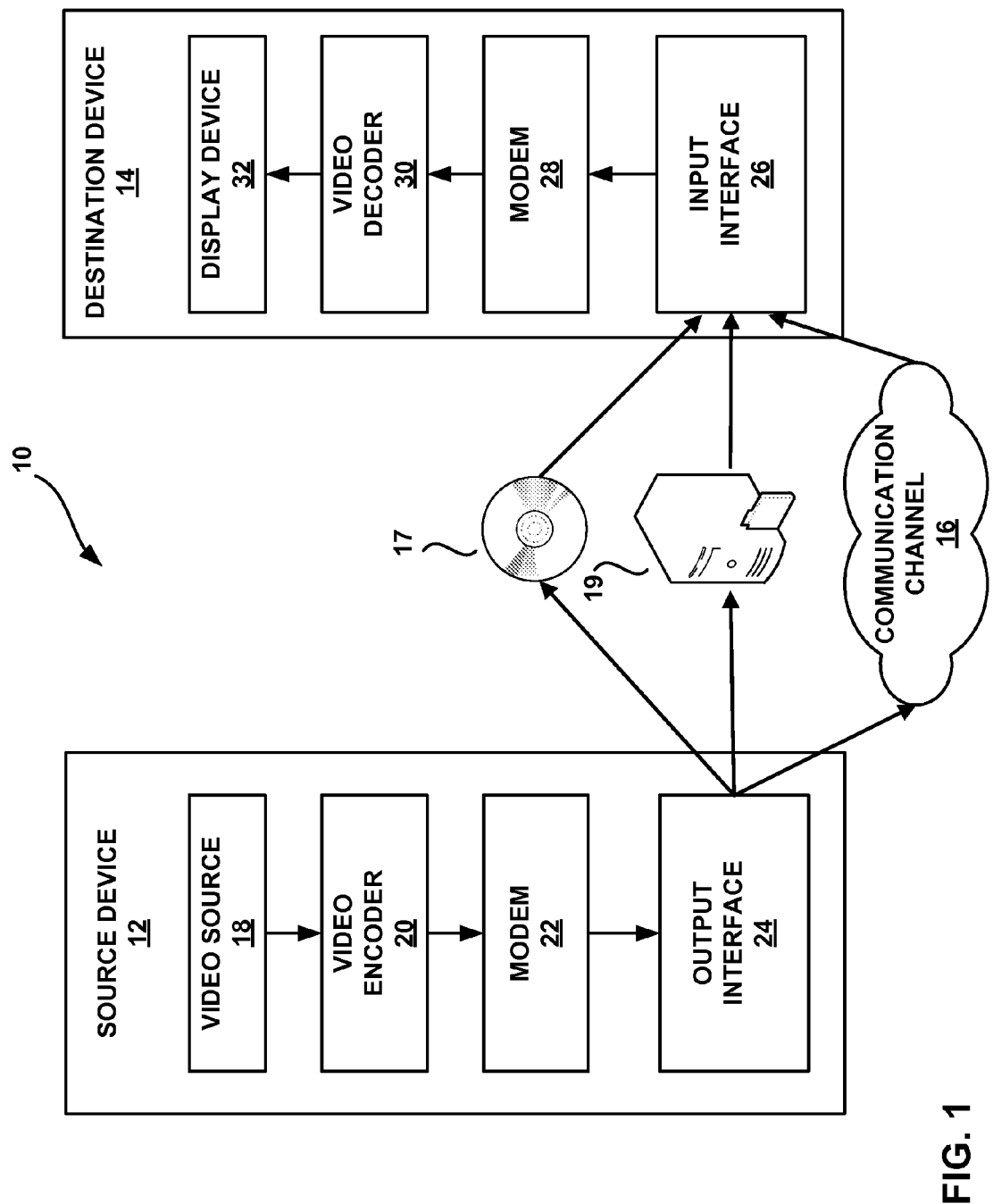
FIG. 1 is a block diagram illustrating an example video encoding and decoding system that may utilize techniques described in this disclosure.

The techniques described in this disclosure are generally related video coding, such as signaling information for reference pictures and management of a picture buffer that stores decoded pictures, referred to as a decoded picture buffer (DPB). Various video coding standards define the manner in which video coding is performed. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD8 hereinafter, is available, as of Jul. 20, 2012, from http://phenix.int-evry.fr/jct/doc_end_user/documents/10_Stockholm/wg11/JCTVC-J1003-v8.zip.

The techniques described in this disclosure may be applicable to any video coding technique, including those described in any of these example standards. For purposes of illustration, the techniques described in this disclosure are described in context of the HEVC standard; however, aspects of this disclosure are not so limited. For example, the techniques described in this disclosure are described in context of the reference picture set, as defined in the HEVC standard, with the understanding that the techniques described in this disclosure are extendable to other standards as well, and generally extendable to any video coding technique.

The video coding techniques described in this disclosure may utilize a reference pictures identified in a reference picture set for inter-predicting a block of a current picture. A reference picture is a picture that can be used for inter-predicting a block within a current picture. For example, video data corresponds to a sequence of individual pictures played back at a relatively high frame rate. Video coders, such as video encoders and video decoders, typically utilize block-based video coding techniques. That is, video coders may divide each of the pictures into a set of individual blocks of video data, then code each individual block of the pictures.

Block-based video coding typically involves two general steps. The first step includes predicting a current block of video data. This prediction may be through the use of intra-prediction (that is, spatial prediction based on neighboring, previously coded blocks of the same picture) or inter-prediction (that is, temporal prediction based on one or more previously coded pictures). These previously coded pictures that can be used for inter-prediction may be referred to as reference pictures. Performance of this prediction process generates a predictive block for the current block. The other step involves coding of a residual block. In general, the residual block represents pixel-by-pixel differences between the original, uncoded version of the current block and the predictive block. A video encoder forms the residual block by calculating the pixel-by-pixel differences, whereas a video decoder adds the residual block to the predictive block to reproduce the original block.

For instance, a video encoder and a video decoder each include respective decoded picture buffers. The respective decoded picture buffers store decoded pictures. For example, as part of video decoding, the video decoder may store a picture, after decoding, in its DPB. The video decoder may then subsequently output the decoded picture for display, and/or may utilize the decoded picture as a reference picture for decoding subsequent inter-predicted pictures.

The video encoder may also store decoded pictures as part of the encoding process. For example, after encoding a picture, the video encoder may perform a reconstruction process, in which the video encoder decodes the encoded picture. The video encoder may store the decoded picture in its DPB for inter-predicting subsequent pictures.

In other words, the video encoder and the video decoder may buffer decoded pictures used for predicting subsequent coded pictures and for future output in the DPB. To efficiently utilize the buffer memory (i.e., the DPB), current and developing video coding standards may specify the DPB management process include the storage process of decoded pictures into the DPB, the marking process of the reference pictures, and the output and removal process of decoded pictures from the DPB. In general, in some current and developing video coding standards, the DPB management may include one or more of the following aspects: picture identification and reference picture identification, reference picture list construction, reference picture marking, picture output from the DPB, picture insertion into the DPB, and picture removal from the DPB.

As described above, the video decoder may store pictures in the DPB, and one or more these pictures may potentially be reference pictures. In accordance with the techniques described in this disclosure, the video encoder may signal information that indicates which pictures in the DPB of the video decoder can be used for inter-predicting a current picture and/or pictures following the current picture in decoding order. In other words, the video encoder may signal reference picture information for a current picture that the video decoder utilizes for deriving the reference picture set, where the reference picture set identifies reference pictures that can be used for inter-predicting the current picture and/or pictures following the current picture in decoding order. It should be understood that reference pictures that can be used for inter-prediction need not necessarily be used for inter-prediction.

The video encoder may signal the information that indicates which reference pictures belong to a reference picture set for each picture. For instance, for each picture, the video decoder may receive information that indicates which reference pictures can be used for inter-predicting that picture and/or inter-predicting pictures following that picture in decoding order.

In general, the video encoder identifies reference pictures using picture order count (POC) values. POC values describe the relative output order (that is, display order) of the corresponding pictures. For example, a picture with a lower POC value is displayed earlier than a picture with a higher POC value. The display order of the pictures and the decoding order of the pictures should not be confused. A picture with a lower POC value need not necessarily by decoded earlier than a picture with a higher POC value. Similarly, a picture with a higher POC value need not necessarily be decoded later than picture with a lower POC value. In some examples, it may be possible that a picture with a lower POC value is also decoded earlier than a picture with a higher POC value.

In some examples, to reduce the number of bits that need to be signaled to identify the POC value of a reference picture, the video encoder may signal the full POC values for certain types of reference pictures, and partial POC values for other types of reference pictures. For example, the video encoder may signal the full POC values, which includes the most significant bits (MSBs) and the least signification bits (LSBs), for an instantaneous decodable refresh (IDR) picture. The IDR picture may be the first picture in a sequence of pictures. For the other pictures in the sequence, the video encoder may signal the partial POC values, which may be only the LSBs. The video decoder may determine the full POC value for a non-IDR picture based on the received LSBs for the non-IDR picture and the previous IDR picture.

While this may function well in reducing the number of bits that need to be signaled for a POC value, there may be issues for random access starting from a non-IDR picture. In random access, the video decoder may decode a coded video sequence starting from an arbitrary random access point.

One example of the random access point is a coded picture that is not the ordinal-first coded picture, which is the IDR picture, in the coded video sequence. In other words, in some examples of random access, the video decoder may decode the video sequence starting from a non-IDR picture.

In this case, the video decoder may receive the partial POC values for the pictures, but may not be able to reconstruct the full POC values for the pictures because the IDR picture may not be available, and hence, the full POC value of the IDR picture may not be available. Then, the video decoder may receive a full POC value for a picture that is to be a reference picture. However, because the video decoder may not be able to reconstruct the full POC values of the decoded pictures, in this example, the video decoder may not be able to determine which picture in the stored DPB is meant to be the reference picture. In other words, the video decoder may not be able to map the POC value of the reference picture to any picture stored in the DPB, which negatively impacts the ability of the video decoder to implement random access.

The techniques described in this disclosure may provide for a more robust mechanism for random access. For example, the video encoder may signal full POC values (e.g., including MSBs and LSBs) for certain non-IDR random access point (RAP) pictures in the video sequence. This may allow the video decoder to implement random access more robustly as there are other pictures in the video sequence whose POC values the video decoder can utilize for reconstructing the full POC values of decoded pictures. In this way, the techniques described in this disclosure address issues that may be present when random access is performed starting from non-IDR pictures in the video sequence, and allow for other non-IDR pictures to be utilized as RAPs allowing for random access at other pictures in the video sequence.

Furthermore, reference pictures in a reference picture set may be generally categorized as long-term reference pictures and short-term reference pictures, where long-term reference pictures are stored longer in the DPB than short-term reference pictures. The signaling overhead for long-term reference pictures may be potentially high and complicated.

In some other techniques (e.g., techniques other than those described in this disclosure), even if the video decoder does not need to utilize a long-term reference picture for inter-predicting a current picture, the video encoder may nevertheless signal information for the long-term reference picture because the video decoder may need to use the long-term reference picture for inter-predicting pictures that are subsequent to the current picture in decoding order. Again, the video encoder may signal information that indicates which reference pictures can be used for inter-predicting the current picture and/or pictures following the current picture in decoding order.

Therefore, if the video decoder does not need a long-term reference picture to inter-predict the current picture, and the video encoder did not signal information of the long-term reference picture, the video decoder may determine that no picture subsequent to the current picture in decoding order needs to use the long-term reference picture for inter-predicting, which may not be true. In this case, in these other techniques, it may be possible that the video decoder removes the long-term reference picture from its DPB, which results in the inability of the video decoder to subsequently decode the picture that does need to utilize the removed long-term reference picture for inter-prediction.

The techniques described in this disclosure may provide for a mechanism to reduce the amount of information that is signaled when the video decoder does not need to use a long-term reference picture for inter-predicting a current picture, but may need the long-term reference picture for inter-predicting pictures subsequent to the current picture in decoding order. For example, the video encoder may signal a first value in the slice header of the current picture that indicates whether the video decoder needs any long-term reference pictures for inter-predicting the current picture. The video encoder may also signal a second value in the slice header of the current picture that indicates whether the video decoder can potentially utilize any of the long-term reference pictures for inter-predicting the current picture (e.g., whether all long-term reference pictures may be used for inter-predicting the current picture). Based on these values, the video encoder may signal different amounts of information in the slice header for long-term reference pictures. Also, the video decoder may determine how much information to expect in the slice header for long-term reference pictures based on these values.

In some examples, the techniques described in this disclosure may be related to DPB management, such as determining which pictures can be removed from the DPB. Picture removal and picture output or display should not be confused. Picture output or display refers to when a picture stored in the DPB is displayed; however, the picture may still remain within DPB because the video encoder or video decoder may utilize that picture for inter-predicting other pictures. Picture removal refers to removal of the picture from the DPB such that the picture is no longer available for prediction purposes.

Some current techniques rely upon reference picture marking to determine which pictures should be removed from the DPB. For reference picture marking, the maximum number, referred to as M (num_ref_frames), of reference pictures used for inter-prediction is indicated in the active sequence parameter set. When a reference picture is decoded, it is marked as "used for reference." If the decoding of the reference picture caused more than M pictures marked as "used for reference," at least one picture must be marked as "unused for reference." The DPB removal process then would remove pictures marked as "unused for reference" from the DPB if they are not needed for output as well.

When a picture is decoded, it may be either a non-reference picture or a reference picture. A reference picture may be a long-term reference picture or short-term reference picture, and when it is marked as "unused for reference", it may become no longer needed for reference. In some video coding standards, there may be reference picture marking operations that change the status of the reference pictures.

There may be two types of operations for the reference picture marking: sliding window and adaptive memory control. The operation mode for reference picture marking may be selected on picture basis; whereas, sliding window operation may work as a first-in-first-out queue with a fixed number of short-term reference pictures. In other words, short-term reference pictures with earliest decoding time may be the first to be removed (marked as picture not used for reference), in an implicit fashion.

The adaptive memory control however removes short-term or long-term pictures explicitly. It also enables switching the status of the short-term and long-term pictures, etc. For example, in adaptive memory control, a video encoder may signal syntax elements that specify which pictures should be marked as used for reference. The video decoder may receive the syntax elements and mark the pictures as specified. In sliding window, the video encoder may not need to signal which pictures should be marked as used for reference. Rather, the video decoder may implicitly (i.e., without receiving syntax elements) determine which pictures should be marked as used for reference based on which pictures are within the sliding window.

The techniques described in this disclosure may rely on the temporal identification value of pictures stored in the DPB and the current picture to determine which pictures in the DPB can be removed. In some examples, there may be other factors, in addition to the temporal identification value, that the video encoder and video decoder may utilize to determine which picture in the DBP can be removed.

The temporal identification value (temporal_id) may be hierarchical value that indicates which pictures can be used for coding the current picture. In general, a picture with a particular temporal_id value can possibly be a reference picture for pictures with equal or greater temporal_id values, but not vice-versa. For example, a picture with a temporal_id value of 1 can possibly be a reference picture for pictures with temporal_id values of 1, 2, 3, . . . , but not for a picture with a temporal_id value of 0.

The lowest temporal_id value may also indicate the lowest display rate. For example, if a video decoder only decoded pictures with temporal_id values of 0, the display rate may be 7.5 pictures per second. If a video decoder only decoded pictures with temporal_id values of 0 and 1, the display rate may be 15 pictures per second, and so forth.

In some other techniques (e.g., techniques other than those described in this disclosure), the reference picture set for the current picture may be defined in such a manner that the reference picture set does not include pictures with higher temporal_id values than that of the current picture. For example, if the temporal_id value of a picture designated as picture A is greater than that of the current picture, the reference picture set for the current picture may not include picture A. In these other techniques, when picture A is not needed for output, the video encoder or the video decoder may remove picture A from its respective DPB. However, the video encoder and the video decoder may need picture A for inter-prediction of pictures subsequent to the current picture in decoding order whose temporal_id value is greater than that of the current picture.

The techniques described in this disclosure provide for a mechanism by which pictures with higher temporal_id values than those of the current picture are not necessarily removed from the DPB. For example, the video encoder and video decoder may be configured to remove a picture from its respective DPB if (1) the picture is not included in the reference picture set of the current picture, (2) the picture is not needed for output, and (3) the temporal_id value of the picture is less than or equal to that of the current picture. By utilizing these three criterion, the techniques may ensure that the video encoder and the video decoder do not inadvertently remove a picture for the DPB that could potentially be needed for inter-predicting a picture subsequent to the current picture in decoding order whose temporal_id value is greater than that of the current picture.

In some examples, after the video decoder derives the reference picture set, the video decoder may construct a reference picture list or reference picture lists. The video decoder may then inter-predict the current picture based on reference pictures identified in the reference picture list(s). The following provides a brief description of reference picture list construction. Furthermore, the video encoder may similarly construct reference picture lists as part of the reconstruction process needed to decode encoded pictures for storage in the DPB.

In some examples, the video encoder and video decoder may construct a single reference picture list (referred to as List 0 or RefPicList0), and in other examples, the video encoder and video decoder may construct two reference picture lists (List 0 and List 1). List 1 maybe referred to as RefPicList1. For example, for a slice that is uni-directionally predicted such as a P-slice and some examples of a B-slice, the video encoder and video decoder may construct one reference picture list (either List 0 or List 1). A uni-directionally predicted slice refers to a slice of a picture whose blocks are predicted from one reference picture. For a slice that is bi-predicted (e.g., a slice whose blocks are predicted with two reference pictures), the video encoder and the video decoder may construct List 0 and List 1, with List 0 identifying of the reference pictures, and List 1 identifying the other.

Typically a reference picture list construction for the first or the second reference picture list includes two steps: reference picture list initialization and reference picture list reordering (modification). The reference picture list initialization is a mechanism that puts the reference pictures in the reference picture memory (e.g., the DPB) into a list based on the order of POC (Picture Order Count, aligned with display order of a picture) values. The reference picture list reordering mechanism can modify the position of a picture that was put in the list during the reference picture list initialization to any new position, or put any reference picture in the DPB in any position, even if the picture does not belong to the initialized list. Some pictures after the reference picture list reordering (modification) may be put in a very further position in the list. However, if a position of a picture exceeds the number of active reference pictures of the list, the picture is not considered as an entry of the final reference picture list. The number of active reference pictures of maybe signaled in the slice header for each list.

FIG. 1 is a block diagram illustrating an example video encoding and decoding system 10 that may utilize techniques described in this disclosure. As shown in FIG. 1, system 10 includes a source device 12 that generates encoded video for decoding by destination device 14. Source device 12 and destination device 14 may each be an example of a video coding device. Source device 12 may transmit the encoded video to destination device 14 via communication channel 16 or may store the encoded video on a storage medium 17 or a file server 19, such that the encoded video may be accessed by the destination device 14 as desired.

Source device 12 and destination device 14 may comprise any of a wide range of devices, including a wireless handset such as so-called "smart" phones, so-called "tablet" computing devices, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, a wireless communication device, or the like.

As indicated above, in many cases, source device 12 and/or destination device 14 may be equipped for wireless communication. Hence, communication channel 16 may comprise a wireless channel, a wired channel, or a combination of wireless and wired channels suitable for transmission of encoded video data. Similarly, the file server 19 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

The techniques of this disclosure, however, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony In the example of FIG. 1, source device 12 includes a video source 18, video encoder 20, a modulator/demodulator (MODEM) 22 and an output interface 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via output interface 24. Modem 22 may include various mixers, filters, amplifiers or other components designed for signal modulation. Output interface 24 may include circuits designed for transmitting data, including amplifiers, filters, and one or more antennas.

The captured, pre-captured, or computer-generated video that is encoded by the video encoder 20 may also be stored onto a storage medium 17 or a file server 19 for later consumption. The storage medium 17 may include Blu-ray discs, DVDs, CD-ROMs, flash memory, or any other suitable digital storage media for storing encoded video. The encoded video stored on the storage medium 17 may then be accessed by destination device 14 for decoding and playback.

File server 19 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 19 may be a streaming transmission, a download transmission, or a combination of both. The file server 19 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes an input interface 26, a modem 28, a video decoder 30, and a display device 32. Input interface 26 of destination device 14 receives information over channel 16, as one example, or from storage medium 17 or file server 17, as alternate examples, and modem 28 demodulates the information to produce a demodulated bitstream for video decoder 30. The demodulated bitstream may include a variety of syntax information generated by video encoder 20 for use by video decoder 30 in decoding video data. Such syntax may also be included with the encoded video data stored on a storage medium 17 or a file server 19. As one example, the syntax may be embedded with the encoded video data, although aspects of this disclosure should not be considered limited to such a requirement. The syntax information defined by video encoder 20, which is also used by video decoder 30, may include syntax elements that describe characteristics and/or processing of video blocks, such as coding tree units (CTUs), coding tree blocks (CTBs), prediction units (PUs), coding units (CUs) or other units of coded video, e.g., video slices, video pictures, and video sequences or groups of pictures (GOPs). Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD8 hereinafter, is available, as of Jul. 20, 2012, from http://phenix.int-evey.fr/jct/doc_end_user/documents/10_Stockholm/wg11/JCTVC-J1003-v8.zip.

The techniques of this disclosure, however, are not limited to any particular coding standard. For purposes of illustration only, the techniques are described in accordance with the HEVC standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more processors including microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. In some instances, video encoder 20 and video decoder 30 may be commonly referred to as a video coder that codes information (e.g., pictures and syntax elements). The coding of information may refer to encoding when the video coder corresponds to video encoder 20. The coding of information may refer to decoding when the video coder corresponds to video decoder 30.

Furthermore, the techniques described in this disclosure may refer to video encoder 20 signaling information. When video encoder 20 signals information, the techniques of this disclosure generally refer to any manner in which video encoder 20 provides the information. For example, when video encoder 20 signals syntax elements to video decoder 30, it may mean that video encoder 20 transmitted the syntax elements to video decoder 30 via output interface 24 and communication channel 16, or that video encoder 20 stored the syntax elements via output interface 24 on storage medium 17 and/or file server 19 for eventual reception by video decoder 30. In this way, signaling from video encoder 20 to video decoder 30 should not be interpreted as requiring transmission from video encoder 20 that is immediately received by video decoder 30, although this may be possible. Rather, signaling from video encoder 20 to video decoder 30 should be interpreted as any technique with which video encoder 20 provides information for eventual reception by video decoder 30, either directly or via an intermediate storage (e.g., in storage medium 17 and/or file server 19).

Video encoder 20 and video decoder 30 may be configured to implement the example techniques described in this disclosure. For example, video encoder 20 and video decoder 30 may allow for random access. Also, video encoder 20 may implement a lightweight signaling of long-term reference pictures for each slice of a current picture.

This may allow video encoder 20 to implement a relatively less complicated manner of signaling information of long-term reference pictures, which allows for video decoder 30 to implement relatively less complicated process for determining which long-term reference pictures are needed for inter-predicting. Furthermore, video encoder 20 and video decoder 30 may manage respective decoded picture buffers (DPBs) by determining which pictures should be removed based on temporal identification values of pictures stored in respective DPBs.

Each of these techniques is described in more detail below. Moreover, these techniques may be implemented separately or in combination with one another. However, prior to describing these techniques, the following describes syntax elements that video encoder 20 may signal in a coded bitstream of video data, and that video decoder 30 may receive in the coded bitstream of video data.

TABLE 1

Sequence Parameter Set RBSP syntax

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_pic_order_cnt_lsb_minus4 | ue(v) |
| max_num_ref_frames | ue(v) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | | pic_width_in_luma_samples may specify the width of each decoded picture in luma samples. The value of pic_width_in_luma_samples may be in the range of 0 to $2^{16}-1$, inclusive.

pic_height_in_luma_samples may specify the height of each decoded picture in luma samples. The value of pic_height_in_luma_samples may be in the range of 0 to $2^{16}-1$, inclusive.

As indicated in Table 1, video decoder 30 may receive in the sequence parameter set (SPS), the log 2_max_pic_order_cnt_lsb_minus4 syntax element. The value of log 2_max_pic_order_cnt_lsb_minu4 may specify the value of the variable MaxPicOrderCntLsb that video decoder 30 uses in the decoding process for determining the POC values, where $MaxPicOrderCntLsb = 2^{(log2\_max\_pic\_order\_cnt\_lsb\_minus4+4)}$.

TABLE 2

Picture Parameter Set RBSP syntax

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| num_short_term_ref_pic_sets_pps | ue(v) |
| for( i = 0; i < num_short_term_ref_pic_sets_pps; i++ ) | |
|   short_term_ref_pic_set( ) | |
| long_term_ref_pics_present_flag | u(1) |
| if( long_term_ref_pics_present_flag ) { | |
|   long_term_ref_pic_id_delta_len_minus4 | ue(v) |
|   long_term_ref_pic_id_len_delta | ue(v) |
|   num_long_term_ref_pics_pps | ue(v) |
|   for( i = 0; i < num_long_term_ref_pics_pps; i++ ) | |
|     long_term_ref_pic_id_pps[ i ] | i(v) |
| } | |
| num_temporal_layer_switching_point_flags | ue(v) |
| for( i = 0; i < num_temporal_layer_switching_point_flags; i++ ) | |
|   temporal_layer_switching_point_flag[ i ] | u(1) |
| num_ref_idx_l0_default_active_minus1 | ue(v) |
| num_ref_idx_l1_default_active_minus1 | ue(v) |
| pic_init_qp_minus26 /* relative to 26 */ | se(v) |
| constrained_intra_pred_flag | u(1) |
| slice_granularity | u(2) |
| shared_pps_info_enabled_flag | u(1) |
| if( shared_pps_info_enabled_flag ) | |
|   if( adaptive_loop_filter_enabled_flag ) | |
|     alf_param( ) | |
| if( cu_qp_delta_enabled_flag ) | |
|   max_cu_qp_delta_depth | u(4) |
| rbsp_trailing_bits( ) | |
| } | | num_short_term_ref_pic_sets_pps specifies the number of short_term_ref_pic_set( ) syntax structures included in the picture parameter set. The value of num_short_term_ref_pic_sets_pps shall be in the range of 0 to 32, inclusive.

long_term_ref_pics_present_flag equal to 0 specifies that no long-term reference picture is used for inter prediction of any coded picture referring to the picture parameter set and the syntax elements long_term_ref_pic_id_delta_len_minus4, long_term_ref_pic_id_len_delta and num_long_term_ref_pics_pps are not present. long_term_ref_pics_present_flag equal to 1 specifies that long-term reference pictures may be used for inter prediction of one or more coded picture referring to the picture parameter set and the syntax elements long_term_ref_pic_id_delta_len_minus4, long_term_ref_pic_id_len_delta and num_long_term_ref_pics_pps are present.

long_term_ref_pic_id_delta_len_minus4 plus 4 specifies the length in bits of the long_term_ref_pic_id_delta_add_foll[i] syntax elements. The value of long_term_ref_pic_id_delta_len_minus4 shall be in the range of 0 to 12, inclusive.

long_term_ref_pic_id_len_delta plus long_term_ref_pic_id_delta_len_minus4 plus 4 specifies the length in bits of the long_term_ref_pic_id_pps[i] syntax element. The value of long_term_ref_pic_id_len_delta may be in the range of 0 to 28−long_term_ref_pic_id_delta_len_minus4, inclusive. The value of long_term_ref_pic_id_len_delta+long_term_ref_pic_id_delta_len_minus4+4 in all picture parameter sets referring to one particular sequence parameter set may be identical.

num_long_term_ref_pics_pps specifies the number of identifications of long-term reference pictures included in the picture parameter set. The value of num_long_term_ref_pics_pps may be in the range of 0 to 32, inclusive.

long_term_ref_pic_id_pps[i] specifies i-th long-term reference picture identification information included in the picture parameter set. The number of bits used to represent long_term_ref_pic_id_pps[i] may be equal to long_term_ref_pic_id_len_delta+long_term_pic_id_len_minus4+4.

TABLE 3

Short-term reference picture set syntax

| short_term_ref_pic_set( ) { | Descriptor |
|---|---|
| num_short_term_curr0 | ue(v) |
| num_short_term_curr1 | ue(v) |
| num_short_term_foll0 | ue(v) |
| num_short_term_foll1 | ue(v) |
| NumShortTerm =     num_short_term_curr0 +         num_short_term_curr1 +         num_short_term_foll0 + num_short_term_foll1 | |
| for( i = 0; i < NumShortTerm; i++ ) | |
|     short_term_ref_pic_id_delta_minus1[ i ] | ue(v) |
| } | |

The short-term reference picture set syntax may be for short-term pictures. A short-term picture may be defined as a reference picture for which the identification information is included in the short_term_ref_pic_set( ) syntax structure for a coded picture, either included in the slice header(s) or included in the referred picture parameter set and reference by the short_term_ref_pic_set_idx syntax element in the slice header(s). The slice header syntax elements are provided in Table 4 below.

num_short_term_curr0 specifies the number of short-term reference pictures in RefPicSetStCurr0 when the short_term_ref_pic_set( ) syntax structure is used for derivation of the reference picture set of a coded picture, as describe below. The value of num_short_term_curr0 may be in the range of 0 to max_num_ref_frames, inclusive.

num_short_term_curr1 specifies the number of short-term reference pictures in RefPicSetStCurr1 when the short_term_ref_pic_set( ) syntax structure is used for derivation of the reference picture set of a coded picture, as describe below. The value of num_short_term_curr1 may be in the range of 0 to max_num_ref_frames−num_short_term_curr0, inclusive.

num_short_term_foll0 specifies the number of short-term reference pictures in RefPicSetStFoll0 when the short_term_ref_pic_set( ) syntax structure is used for derivation of the reference picture set of a coded picture, as describe below. The value of num_short_term_foll0 may be in the range of 0 to max_num_ref_frames−num_short_term_curr0−num_short_term_curr1, inclusive.

num_short_term_foll1 specifies the number of short-term reference pictures in RefPicSetStFoll1 when the short_term_ref_pic_set( ) syntax structure is used for derivation of the reference picture set of a coded picture, as describe below. The value of num_short_term_foll1 shall be in the range of 0 to max_num_ref_frames−num_short_term_curr0−num_short_term_curr1−num_short_term_foll0, inclusive.

short_term_ref_pic_id_delta_minus1[i] specifies the identification information of the i-th short-term reference picture included in the short_term_ref_pic_set( ) syntax structure.

TABLE 4

Slice header syntax

| slice_header( ) { | Descriptor |
|---|---|
| lightweight_slice_flag | u(1) |
| if( !lightweight_slice_flag ) { | |
|     slice_type | ue(v) |
|     pic_parameter_set_id | ue(v) |
|     if( IdrPicFlag ) { | |
|         idr_pic_id | ue(v) |
|         no_output_of_prior_pics_flag | u(1) |
|     } | |
|     if ( CraPicFlag ) | |
|         pic_order_cnt | i(v) |
|     Else | |
|         pic_order_cnt_lsb | u(v) |
|     if( !IdrPicFlag ) { | |
|         short_term_ref_pic_set_pps_flag | u(1) |
|         if( short_term_ref_pic_set_pps_flag ) | |
|             short_term_ref_pic_set_idx | ue(v) |
|         Else | |
|             short_term_ref_pic_set( ) | |
|         if( long_term_ref_pics_present_flag ) | |
|             long_term_ref_pic_set( ) | |
|     } | |
|     if( slice_type = = P || slice_type = = B ) { | |
|         num_ref_idx_active_override_flag | u(1) |
|         if( num_ref_idx_active_override_flag ) { | |
|             num_ref_idx_l0_active_minus1 | ue(v) |
|             if( slice_type = = B ) | |
|                 num_ref_idx_l1_active_minus1 | ue(v) |
|         } | |
|     } | |
|     ref_pic_list_modification( ) | |
|     ref_pic_list_combination( ) | |
| } | |
| if( entropy_coding_mode_flag && slice_type != I) | |
|     cabac_init_idc | ue(v) |
| first_slice_in_pic_flag | u(1) |
| if( first_slice_in_pic_flag == 0 ) | |
|     slice_address | u(v) |
| if( !lightweight_slice_flag ) { | |
|     slice_qp_delta | se(v) |
|     if( sample_adaptive_offset_enabled_flag ) | |
|         sao_param( ) | |
|     if( deblocking_filter_control_present_flag ) { | |
|         disable_deblocking_filter_idc | |
|         if( disable_deblocking_filter_idc != 1 ) { | |
|             slice_alpha_c0_offset_div2 | |
|             slice_beta_offset_div2 | |
|         } | |
|     } | |
|     if( slice_type = = B ) | |
|         collocated_from_l0_flag | u(1) |
|     if( adaptive_loop_filter_enabled_flag ) { | |
|         if( !shared_pps_info_enabled_flag ) | |
|             alf_param( ) | |
|         alf_cu_control_param( ) | |
|     } | |
| } | |
| } | | idr_pic_id identifies an instantaneous decoder refresh (IDR) picture.

pic_parameter_set_id indicates the picture parameter set and is used to refer to the picture parameter set.

The variable CraPicFlag is set equal to 1 if the slice belongs to a clear random access (CRA) picture.

pic_order_cnt may specify the picture order count (POC) value of the current picture. If long_term_ref_pic_id_len_delta and long_term_pic_id_len_minus4 are present in the referred picture parameter set, the number of bits used to represent this value may be equal to long_term_ref_pic_id_len_delta+long_term_pic_id_len_minus4+4. Otherwise, the number of bits used to represent this value may be equal to 32.

no_output_of_prior_pics_flag specifies how the previously-decoded pictures in the decoded picture buffer are treated after decoding of an IDR picture. When the IDR picture is the first IDR picture in the bitstream, the value of no_output_of_prior_pics_flag may have no effect on the decoding process. When the IDR picture is not the first IDR picture in the bitstream and the value of pic_width_in_luma_samples or pic_height_in_luma_samples or max_dec_frame_buffering derived from the active sequence parameter set may be different from the value of pic_width_in_luma_samples or pic_height_in_luma_samples or max_dec_frame_buffering derived from the sequence parameter set active for the preceding picture, no_output_of_prior_pics_flag equal to 1 may, but not necessarily, be inferred by the decoder, regardless of the actual value of no_output_of_prior_pics_flag.

short_term_ref_pic_set_pps_flag equal to 1 specifies that the identification information of the set of short-term reference pictures included in the reference picture set for the current picture is present in the referred picture parameter set. short_term_ref_pic_set_pps_flag equal to 0 specifies that the identification information of the set of short-term reference pictures included in the reference picture set for the current picture is not present in the referred picture parameter set.

short_term_ref_pic_set_idx specifies the index of the short_term_ref_pic_set( ) syntax structure, included in the referred picture parameter set, that includes the identification information of the set of short-term reference pictures in the reference picture set for the current picture.

The variable NumShortTermCurr0 and NumShortTermCurr1 are specified as:

NumShortTermCurr0=num_short_term_curr0

NumShortTermCurr1=num_short_term_curr1

Where num_short_term_curr0 and num_short_term_curr0 are the syntax elements of the same names, respectively, in the short_term_ref_pic_set( ) syntax structure, either present in the referred picture parameter set and referenced by short_term_ref_pic_set_idx, or directly present in the slice header.

num_ref_idx_l0_active_minus1 specifies the maximum reference index for reference picture list 0 that shall be used to decode the slice.

When the current slice is a P or B slice and num_ref_idx_l0_active_minus1 is not present, num_ref_idx_l0_active_minus1 may be inferred to be equal to num_ref_idx_l0_default_active_minus1.

The value of num_ref_idx_l0_active_minus1 may be in the range of 0 to 15, inclusive.

num_ref_idx_l1_active_minus1 specifies the maximum reference index for reference picture list 1 that shall be used to decode the slice.

When the current slice is a P or B slice and num_ref_idx_l1_active_minus1 is not present, num_ref_idx_l1_active_minus1 may be inferred to be equal to num_ref_idx_l1_default_active_minus1.

The value of num_ref_idx_l1_active_minus1 may be in the range of 0 to 15, inclusive.

TABLE 5

Long-term reference picture set syntax

| long_term_ref_pic_set( ) { | Descriptor |
|---|---|
|   long_term_not_used_flag | u(1) |
|   if ( !long_term_not_used_flag ) | |
|     long_term_reuse_pps_flag | u(1) |
|   if (!long_term_not_used_flag && | |
|   !long_term_reuse_pps_flag) { | |
|     num_long_term_pps_curr | ue(v) |
|     num_long_term_add_curr | ue(v) |
|     num_long_term_pps_foll | ue(v) |
|     num_long_term_add_foll | ue(v) |
|     for( i = 0; i < num_long_term_pps_curr + | |
|     num_long_term_pps_foll; i++ ) | |
|       long_term_ref_pic_set_idx_pps[ i ] | ue(v) |
|     for( i = 0; i < num_long_term_add_curr + | |
|     num_long_term_add_foll; i++ ) | |
|       long_term_ref_pic_id_delta_add[ i ] | i(v) |
|   } | |
| } | |

The long-term reference picture set syntax may be for long-term pictures. A long-term picture may be defined as a reference picture for which the identification information is included in the long_term_ref_pic_set( ) syntax structure for a coded picture. In general, long-term reference pictures may be stored in the DPB longer than short-term reference pictures.

long_term_not_used_flag equal to 1 may indicate that no long-term reference picture is used for inter-prediction of the current picture as well as pictures following the current picture in decoding order. This flag equal to 0 may indicate that use of long-term reference pictures is signaled by the remaining syntax elements of the long-term reference picture set syntax table.

When long_term_not_used_flag is equal to 1, num_long_term_pps_curr, num_long_term_add_curr, num_long_term_pps_foll, and num_long_term_add_foll may be inferred to be 0, 0, num_long_term_ref_pics_pps, and 0, respectively.

long_term_reuse_pps_flag equal to 1 may indicate that all long-term reference pictures as specified in the referred picture parameter set may be used for prediction of the current picture, and long-term reference pictures that are not indicated in the referred PPS and that are prior to the current picture in decoding order may not be used for inter-prediction of the current picture or pictures following the current picture in decoding order. This flag equal to 0 may indicate that use of long-term reference pictures is signaled by the remaining syntax elements of the long-term reference picture set syntax table.

When long_term_reuse_pps_flag is equal to 1, num_long_term_pps_curr, num_long_term_add_curr, num_long_term_pps_foll, and num_long_term_add_foll may be inferred to be num_long_term_ref_pics_pps, 0, 0 and 0, respectively.

When not represent, this flag may be inferred to be equal to 0.

num_long_term_pps_curr specifies the number of all long-term reference pictures that the identification information is included in the referred picture parameter set and that may be used for inter prediction of the current picture. If num_long_term_pps_curr is not present, the value may be derived as equal to 0. The value of num_long_term_pps_curr may be in the range of 0 to max_num_ref_frames, inclusive.

num_long_term_add_curr specifies the number of all long-term reference pictures that the identification information is not included in the referred picture parameter set and that may be used for inter prediction of the current picture. If num_long_term_add_curr is not present, the value may be derived as equal to 0. The value of num_long_term_add_curr may be in the range of 0 to max_num_ref_frames−num_long_term_pps_curr, inclusive.

The variable NumLongTermCurr is specified as:

NumLongTermCurr=num_long_term_pps_curr+num_long_term_add_curr num_long_term_pps_foll specifies the number of all long-term reference pictures that the identification information is included in the referred picture parameter set, that are not used for inter prediction of the current picture, and that may be used for inter prediction of any of the pictures following the current picture in decoding order. If num_long_term_pps_foll is not present, the value may be derived as equal to 0. The value of num_long_term_pps_foll may be in the range of 0 to max_num_ref_frames, inclusive.

num_long_term_add_foll specifies the number of all long-term reference pictures that the identification information is not included in the referred picture parameter set, that are not used for inter prediction of the current picture, and that may be used for inter prediction of any of the following pictures in decoding order. If num_long_term_add_foll is not present, the value may be derived as equal to 0. The value of num_long_term_add_foll may be in the range of 0 to max_num_ref_frames−num_long_term_pps_foll, inclusive.

long_term_ref_pic_set_idx_pps[i] specifies the index, to the list of long-term reference picture identification information included in the referred picture parameter set, of the i-th long-term reference picture inherited from the referred picture parameter set to the reference picture set of the current picture. The value of long_term_ref_pic_set_idx_pps[i] may be in the range of 0 to 31, inclusive.

long_term_ref_pic_id_delta_add[i] specifies the long-term reference picture identification information of the i-th long-term reference picture that is not inherited from the referred picture parameter set but included in the reference picture set of the current picture. The number of bits used to represent long_term_ref_pic_id_add_curr[i] may be equal to long_term_pic_id_len_minus4+4.

With the above signaled or derived values (i.e., the syntax elements and values in Tables 1-5), video decoder 30 may allow for more pictures to qualify as random access point (RAPs). A random access point may refer to a picture in the video sequence from where video decoder 30 can begin decoding pictures. For example, a RAP picture may be a picture that is not predicted with respect to any other pictures (i.e., all slices within the RAP picture are intra-predicted), and pictures that are subsequent to the RAP picture in decoding order may not be predicted with respect to any picture that is prior to the RAP picture in decoding order. Therefore, video decoder 30 may be able to decode the RAP picture and pictures following the RAP picture in decoding order without needing any picture that is earlier than the RAP picture in decoding order.

One example of the RAP picture is the instantaneous decoder refresh (IDR) picture, which is the first picture in the video sequence of the video data. There may be other examples of RAP pictures, as described in more detail, and the techniques may allow for random access to occur from these RAP pictures as well, and not just limited to IDR RAP pictures.

In the techniques described in this disclosure, for a non-RAP picture (e.g., a picture from which video decoder 30 cannot start decoding), video encoder 20 may signal partial identifier value (e.g., partial POC value) in the slice header that forms a part of the full POC value of the current picture. For example, as illustrated in Table 4, video encoder 20 may signal the pic_order_cnt_lsb value of the current picture, where the pic_order_cnt_lsb value is the least significant bits (LSBs) of the full POC value of the current picture. For example, the pic_order_cnt_lsb value may specify the picture order count modulo MaxPicOrderCntLsb for the coded picture. The length of the pic_order_cnt_lsb value may be log 2_max_pic_order_cnt_lsb_minus4+4 bits. The value of the pic_order_cnt_lsb may be in the range of 0 to MaxPicOrderCntLsb−1, inclusive.

From the pic order_cnt_lsb value, video decoder 30 may determine the full POC value of the current picture. For example, video decoder 30 may also receive the log 2_max_pic_order_cnt_lsb_minus4 syntax element in the coded bitstream signaled by video encoder 20. Video decoder 30 may receive the log 2_max_pic_order_cnt_lsb_minus4 syntax element in the sequence parameter set. The value of log 2_max_pic_order_cnt_lsb_minu4 may be in the range of 0 to 12, inclusive. The log 2_max_pic_order_cnt_lsb_minus4 syntax element may specify the value of the variable MaxPicOrderCntLsb that video decoder 30 uses in the decoding process for determining the POC values. For example:

$$\text{MaxPicOrderCntLsb}=\text{MaxPicOrderCntLsb}=2^{(log2\_max\_pic\_order\_cnt\_lsb\_minus4+4)}.$$

From these received syntax elements, video decoder 30 may determine the POC value of the current picture as follows. For example, video decoder 30 may determine the PicOrderCntMsb for the current picture. The POC value for the current picture may be the determined PicOrderCntMsb for the current picture plus the received pic_order_cnt_lsb for the current picture.

As part of the process of determining the POC value for the current picture, video decoder 30 may determine the variables prevPicOrderCntMsb and prevPicOrderCntLsb. For example, if the current picture is an IDR picture, video decoder 30 may set prevPicOrderCntMsb equal to 0, and set prevPicOrderCntLsb equal to 0. Otherwise (i.e., where the current picture is not an IDR picture), video decoder 30 may set prevPicOrderCntMsb equal to PicOrderCntMsb of the previous reference picture in decoding order with less or equal temporal_id than the current picture, and set prevPicOrderCntLsb equal to the value of pic_order_cnt_lsb of the previous reference picture in decoding order with less or equal temporal_id than the current picture.

With these variable values and the values of the syntax elements (e.g., the values of prevPicOrderCntMsb, prevPicOrderCntLsb, pic_order_cnt_lsb, and MaxPicOrderCntLsb), video decoder 30 may determine the value of PicOrderCntMsb based on the steps set forth in the following pseudo code. It should be understood that video decoder 30 may implement the steps set forth in the following pseudo code to determine the PicOrderCntMsb for each current picture, which is used to derive the POC value of the current picture.

```
if (( pic_order_cnt_lsb < prevPicOrderCntLsb ) &&
(( prevPicOrderCntLsb - pic_order_cnt_lsb ) >=
( MaxPicOrderCntLsb / 2 )))
{
    PicOrderCntMsb = prevPicOrderCntMsb + MaxPicOrderCntLsb
}
else if (( pic_order_cnt_lsb > prevPicOrderCntLsb ) &&
(( pic_order_cnt_lsb - prevPicOrderCntLsb ) >
( MaxPicOrderCntLsb / 2 )))
{
    PicOrderCntMsb = prevPicOrderCntMsb - MaxPicOrderCntLsb
else
{
    PicOrderCntMsb = prevPicOrderCntMsb
}
```

After determining the PicOrderCntMsb for the current picture, video decoder 30 may determine the POC value for the current picture based on the PicOrderCntMsb for the current picture and the pic_order_cnt_lsb for the current picture. Video decoder 30 may determine the POC value for the current picture as follows:

PicOrderCnt=PicOrderCntMsb+pic_order_cnt_lsb.

After decoding the current picture, video decoder 30 may store the PicOrderCntMsb value, the pic_order_cnt_lsb value, and the POC value for that picture in the decoded picture buffer (DPB) of video decoder 30. In this way, each picture in the DPB is associated with a POC value, a PicOrderCntMsb value, and a pic_order_cnt_lsb value.

In some instances, video decoder 30 may need to determine whether this decoded picture can be used as a reference picture for a subsequent picture. For instance, for this subsequent picture, video decoder 30 may receive the full POC value, in a parameter set such as the picture parameter set, for a long-term reference picture that video decoder 30 can use for inter-predicting this subsequent picture. In this example, assume that the POC value for the long-term reference picture is equal to the determined POC value for the current picture. Accordingly, video decoder 30 may determine that the long-term reference picture that can be used for inter-predicting the subsequent picture is the current decoded picture based on the received POC value of the long-term reference picture and the determined POC value of the current decoded picture (i.e., video decoder 30 may map the received POC value of the long-term reference picture to the POC value of the current decoded picture). Video decoder 30 may then identify the current decoded picture as a picture that can be used for inter-predicting the subsequent picture.

By signaling the partial identifier value of the current picture (e.g., the LSBs of the POC value of the current picture), video encoder 20 may reduce the amount of bits that need to be signaled, and video decoder 30 may need to receive fewer bits. However, there may be certain issues if video decoder 30 starts decoding at a non-IDR RAP picture.

For example, as described above, video decoder 30 may determine the full POC value of the current picture based on the IDR picture (e.g., the prevPicOrderCntLsb and prevPicOrderCntMsb variables described above that are used to determine the full POC value are incremented starting from the IDR picture). If video decoder 30 is to begin decoding at a non-IDR RAP picture, then the IDR picture may not be available, and video decoder 30 may not be able to determine the full POC value of the non-IDR RAP picture. In this case, if video decoder 30 receives the full POC value for a reference picture that is to be used for inter-predicting the picture subsequent to the non-IDR RAP picture. For instance, the reference picture may be a long-term reference picture, and video encoder 20 may signal the full POC value of the long-term reference picture in the picture parameter set. In this case, video decoder 30 may not be able to map the POC value for the reference picture to a picture in the DPB because video decoder 30 may have been unable to determine the full POC values for the pictures in the DPB.

For example, in some examples for inter-predicting a picture, video decoder 30 may construct a plurality of reference picture subsets that together form a reference picture set, as described in more detail below. These reference picture subsets identify reference pictures that can be used for inter-predicting the picture, but do not necessarily have to be used for inter-predicting the picture.

In some examples, video encoder 20 may signal the full POC values for long-term reference pictures that can be used for inter-predicting a picture in the picture parameter set. However, if video decoder 30 is not able to determine the full POC value for a picture, such as if video decoder 30 began decoding at a non-IDR RAP picture, then video decoder 30 may not be able to determine which picture stored in the DPB is referred to by the full POC values of the long-term reference pictures that are signaled in the picture parameter set.

This may limit the options for random access. As described in more detail, the techniques described in this disclosure allow for video decoder 30 to address issues that may be present when utilizing non-IDR RAP pictures for random access.

For instance, in accordance with the techniques described in the disclosure, video decoder 30 may be able to being decoding from a non-IDR RAP picture. A non-IDR RAP picture may be picture that meets the following criteria. In this example, the non-IDR RAP picture is designated as picR.

The first criteria for the non-IDR RAP picture picR is that picR is not an IDR picture. The second criteria for the non-IDR RAP picture picR is that all pictures following picR in output order and decoding order can be correctly decoded. For example, let the POC value of picR be rPOC, and let picA be a picture in the same coded video sequence that follows picR in both decoding order and output order, and let the POC value of pica be aPOC. When random access is performed at picR, all pictures that are in the same coded video sequence and follow picA in output order can be correctly decoded.

For a non-IDR RAP picture picR, it is referred to as a clean random access (CRA) picture if when random access is performed at picR, all pictures that are in the same coded video sequence and follow picR in output order can be correctly decoded. If this condition is not true for a non-IDR RAP picture picR, it is referred to as a gradual decoding refresh (GDR) picture.

An additional example of a non-IDR RAP picture is a broken link access (BLA) picture. BLA pictures may be similar to CRA pictures in terms of prediction structure (e.g., which pictures following the BLA picture can be used for inter-prediction).

The techniques described in this disclosure may allow video decoder 30 to perform random access starting from a non-IDR RAP picture, examples of which include the CRA picture, the GDR picture, and the BLA picture, although the techniques are extendable to other types of non-IDR RAP pictures. For example, Table 4 defines the CraPicFlag syntax element. If the current picture is a CRA picture, in accordance with Table 4, video encoder 20 may set the CraPicFlag to true (i.e., a value of 1). As indicated in Table 4, if CraPicFlag is true, video encoder 20 may signal the full POC value of the current picture. For instance, if CraPicFlag is true, video encoder 20 may signal a POC value that includes the most significant bits (MSBs) and the LSBs of the POC value of the current picture.

In this way, if video decoder 30 performs random access starting from a CRA picture (i.e., a non-IDR RAP picture), video decoder 30 may be able to store the full POC value for the non-IDR RAP picture in the DPB even if the IDR picture is not available. Then, video decoder 30 may be able to determine the full POC values of pictures subsequent to the CRA picture based on the full POC value of the CRA picture.

For instance, for a non-RAP picture subsequent to the CRA picture, video decoder 30 may receive the partial identifier value (e.g., the LSBs of the POC value). From the LSBs of the POC value and the full POC value of the CRA picture, video decoder 30 may be able to determine the full POC value of the subsequent picture. This may allow video decoder 30 to utilize the CRA picture and the picture subsequent to the CRA picture for inter-prediction. For instance, if video encoder 20 signals the full POC value for a reference picture (e.g., a short-term reference picture or a long-term reference picture) that can be used for inter-predicting a later picture, video decoder 30 may be able to identify which picture in the DPB is the reference picture that can be used for inter-predicting the subsequent picture.

In this way, for non-RAP pictures following the non-IDR RAP picture in decoding order, video decoder 30 may identify reference pictures that can be used for inter-predicting the non-RAP pictures based on the full POC value of the non-IDR RAP picture. For example, video decoder 30 may be able to construct a reference picture subset by including the picture in the DPB that video decoder 30 determined to be the long-term picture signaled in the picture parameter set in the reference picture subset.

In this way, video decoder 30 may perform random access starting from a CRA picture, which is one example of a non-IDR RAP picture. However, aspects of this disclosure are not so limited. In other examples, video encoder 20 may set a GdrPicFlag to true if the current picture is a GDR picture, and may signal the full POC value of the GDR picture. Similarly, video encoder 20 may set a BlaPicFlag to true if the current picture is a BLA picture, and may signal the full POC value of the BLA picture. For instance, in the above examples, video encoder 20 may replace the "if (CraPicFlag)" of Table 4, with "if (GdrPicFlag)" or 37 if (BlaPicFlag).

Alternatively, video encoder 20 may replace the "if (CraPicFlag)" of Table 4, with "if (CraPicFlag||GdrPicFlag ||BlaPicFlag)." In this case, if the current picture is any of a CRA picture, a GDR picture, or a BLA picture, video encoder 20 may signal the full POC value for the picture. It need not be necessary for video decoder 30 to perform random access on all possible non-IDR RAP pictures, in every example, and video encoder 20 may limit which non-IDR RAP pictures that video decoder 30 can utilize for random access. For instance, video encoder 20 may replace the "if (CraPicFlag)" in Table 4 with "if (CraPicFlag ||GdrPicFlag)," thereby limiting random access to CRA and GDR pictures, and not allowing random access for BLA pictures. Other permutations and combinations may be possible for which pictures video decoder 30 can utilize for random access.

Moreover, video encoder 20 need not necessarily signal the full POC values for the RAP pictures. For example, in some instances, video encoder 20 may separately signal the MSBs of the POC value and the LSBs of the POC value for a RAP picture. For example, video encoder 20 may signal the pic_order_cnt_msb value in the slice header.

pic_order_cnt_msb specifies the MSB part of the picture order count of the current picture. If long_term_ref_pic_id_len_delta and long_term_pic_id_len_minus4 are present in the referred picture parameter set, the number of bits used to represent this value may be equal to long_term_ref_pic_id_len_delta+long_term_pic_id_len_minus4−log 2_max_pic_order_cnt_lsb_minus4. Otherwise, the number of bits used to represent this value may be equal to 32−log 2_max_pic_order_cnt_lsb_minus4.

In this example, video decoder 30 may determine the full POC value for the current picture as follows:

PicOrderCnt=pic_order_cnt_msb<<(log 2_max_pic_order_cnt_lsb_minus4+4)+pic_order_cnt_lsb.

In this example, video encoder 20 may signal the pic_order_cnt_msb for the non-IDR RAP picture, and separately signal the pic_order_cnt_lsb, rather than signal all of the bits (e.g., the combination of the MSBs and the LSBs) of the non-IDR RAP picture. Video decoder 30 may separately decode the MSB part and the LSB part of the full POC value of the non-IDR RAP picture. Video decoder 30 may then determine the full POC value for the non-IDR RAP picture utilizing the above techniques.

Moreover, in some other examples, video encoder 20 may not signal the full POC values for the non-IDR RAP pictures. For instance, video encoder 20 may signal the MSB part of the CRA, GDR, or BLA pictures. In this example, video decoder 30 may determine the full POC values for these pictures in a similar manner as the previous equation for determining full POC values from the MSB part of the POC value.

The above describes example ways in which video encoder 20 and video decoder 30 allow for random access from a non-IDR RAP picture. Accordingly, in some examples, a video coder (e.g., video encoder 20 or video decoder 30) may code (e.g., encode or decode) a full identifier value for a random access point (RAP) picture that is not an instantaneous decoder refresh (IDR) picture. A RAP picture may be a type of a picture for starting decoding of a bitstream, where at least some pictures following the RAP picture in decoding order are not inter-predicted with respect to any picture previous to the RAP picture in decoding order. As described above, examples of the non-IDR RAP picture include the CRA, BLA, and GDR picture.

In some examples, the video coder may code all of the bits (e.g., the MSB part and the LSB part) of the full identifier value for the non-IDR RAP picture. In some other examples, the video coder may separately code the MSB part and the LSB part of the full identifier value of the non-IDR RAP picture. One example of the identifier value of the non-IDR RAP picture is the POC value of the non-IDR RAP picture.

The video coder may code a partial identifier value for a first non-RAP picture. In this example, the partial identifier value may be a portion of the full POC value of the first non-RAP picture. This first non-RAP picture may follow the non-IDR RAP picture in decoding order.

The video coder may also inter-predict a second non-RAP picture based on the full identifier value for the first non-RAP picture. For example, the video coder may determine that the video coder is to use the first non-RAP picture for inter-predicting the second non-RAP picture based on the full identifier value for the first non-RAP picture. In this case, the video coder inter-predicts the second non-RAP picture based on the first non-RAP picture. The second non-RAP picture follows both the non-IDR RAP picture and the first non-RAP picture in decoding order.

In some examples, the video coder may further code in a parameter set, such as a picture parameter set, full identifier values for one or more reference pictures, such as long-term reference pictures, that can be used for inter-predicting the second non-RAP picture. In this example, the video coder (e.g., video decoder 30) may determine the full identifier value for the first non-RAP picture based on the full identifier value for the non-IDR RAP picture and the partial identifier value for the first non-RAP picture.

The video coder may determine whether a full identifier value for at least one of the one or more reference pictures is same as the full identifier value for the first non-RAP picture. If the full identifier value for the at least one of the one or more reference pictures is the same as the full identifier value for the first non-RAP picture, the video coder may include the first non-RAP picture in a reference picture subset that identifies reference pictures that can be used for inter-predicting the second non-RAP picture.

In some examples, the techniques described in this disclosure may be related to signaling of long-term reference pictures in the slice header. In general, reference pictures may be categorized as short-term reference pictures or long-term reference pictures. In accordance with the techniques described in this disclosure, video encoder 20 may signal information indicative of a reference picture set for a current picture. The reference picture set for the current picture may identify reference pictures that can be used for inter-predicting the current picture and/or can be used for inter-predicting pictures following the current picture in decoding order. The reference pictures in the reference picture set may be short-term reference pictures and long-term reference pictures.

For instance, video encoder 20 may signal information that indicates which short-term reference pictures belong in the reference picture set, and which long-term reference pictures belong in the reference picture set. From this information, video decoder 30 may construct a plurality of reference picture subsets, where each reference picture subset identifies zero or more reference pictures that belong to the reference picture set. From the constructed reference picture subsets, video decoder 30 may derive the reference picture set.

Video decoder 30 may implement the derivation process for deriving the reference picture set once per picture. For example, video decoder 30 may derive the reference picture set after decoding the slice header, but prior to decoding any blocks within the current picture and prior to constructing the reference picture list(s) that identify the reference picture(s) that are used to inter-predict the slice within the current picture.

The reference picture subsets may include subsets that identify short-term reference pictures that belong to the reference picture set, and long-term reference pictures that belong to the reference picture set. In some examples, video decoder 30 may construct six reference picture subsets, with four reference picture subsets including zero or more short-term reference pictures, and two reference picture subset including zero or more long-term reference pictures. The four reference picture subsets for the short-term reference pictures may be referred to as RefPicSetStCurr0, RefPicSetStCurr1, RefPicSetStFoll0, and RefPicSetStFoll1. The two reference picture subsets for the long-term reference pictures may be referred to as RefPicSetLtCurr and RefPicSetLtFoll.

It should be understood that the six reference picture subsets are described for purposes of illustration, and should not be construed limiting. As one example, video decoder 30 may construct fewer reference picture subsets than six reference picture subsets, e.g., by combining some of the subsets. Some of these examples where video decoder 30 constructs less than six reference picture subsets are described below. However, for purposes of illustration, the techniques are described with examples where video decoder 30 constructs six reference picture subsets.

In some examples, the RefPicSetStCurr0 reference picture subset may include, and may only include, identification information, such as POC values, of all short-term reference pictures that have an earlier output or display order than the current picture, and that can be used for reference in inter-prediction of the current picture, and can be used for reference in inter-prediction of one or more pictures following the current picture in decoding order. The RefPicSetStCurr1 reference picture subset may include, and may only include, identification information of all short-term reference pictures that have a later output or display order than the current picture and that can be used for reference in inter-prediction of the current picture, and can be used for reference in inter-prediction of one or more pictures following the current picture in decoding order.

The RefPicSetStFoll0 reference picture subset may include, and may only include, identification information of all short-term reference pictures that have an earlier output or display order than the current picture, that can be used for reference in inter-prediction of one or more pictures following the current picture in decoding order, and that cannot be used for reference in inter-prediction of the current picture. The RefPicSetStFoll1 reference picture subset may include, and may only include, identification information of all short-term reference pictures that have a later output or display order than the current picture, that can be used for reference in inter-prediction of one or more pictures following the current picture in decoding order, and that cannot be used for reference in inter-prediction of the current picture.

The RefPicSetLtCurr reference picture subset may include, and may only include, the identification information of all long-term reference pictures that can be used for reference in inter-prediction of the current picture, and that can be used for reference in inter-prediction of one or more pictures following the current picture in decoding order. The RefPicSetLtFoll reference picture subset may include, and may only include, the identification information of all long-term reference pictures that can be used for reference in inter-prediction of one or more pictures following the current picture in decoding order, and that cannot be used for reference in inter-prediction of the current picture.

If the current picture is an IDR picture, then video decoder 30 may set the RefPicSetStCurr0, RefPicSetStCurr1, RefPicSetStFoll0, RefPicSetStFoll1, RefPicSetLtCurr, and RefPicSetLtFoll reference picture subsets to empty. As described above, an IDR picture is not inter-predicted, and therefore, there are no reference pictures for the IDR picture.

As indicated in Table 4, the slice header refers to the short_term_ref_pic_set( ) syntax structure, which is further defined in Table 3. Table 3 defines the num_short_term_curr0, num_short_term_curr1, num_short_term_foll0, and num_short_term_foll1 syntax elements. These syntax elements may define the number of pictures in the RefPicSetStCurr0, RefPicSetStCurr1, RefPicSetStFoll0, and RefPicSetStFoll1 reference picture subsets, respectively.

Based on these syntax elements and the short_term_ref_pic_id_delta_minus1 syntax element, video decoder 30 may construct the RefPicSetStCurr0, RefPicSetStCurr1, RefPicSetStFoll0, and RefPicSetStFoll1 reference picture subsets. In general, it may be immaterial the specific manner in which video decoder 30 constructs these reference picture subsets that identify the short-term reference pictures. The following pseudo code describes one example manner in which video decoder 30 may construct the reference picture subsets for the short-term reference pictures.

```
cIdx = 0
for( i = 0, pocPred = PicOrderCnt( CurrPic ); i < num_short_term_curr0; pocPred =
RefPicSetStCurr0[ i ], i++, cIdx++ )
{
    RefPicSetStCurr0[ i ] = pocPred − short_term_ref_pic_id_delta_minus1[ cIdx ]
        − 1
}
for( i = 0, pocPred = PicOrderCnt( CurrPic ); i < num_short_term_curr1; pocPred =
RefPicSetStCurr1[ i ], i++, cIdx++ )
{
    RefPicSetStCurr1[ i ] = short_term_ref_pic_id_delta_minus1[ cIdx ] + 1 −
        pocPred
}
for( i = 0, pocPred = PicOrderCnt( CurrPic ); i < num_short_term_foll0; pocPred =
RefPicSetStFoll[ i ], i++, cIdx++ )
{
    RefPicSetStFoll0[ i ] = pocPred − short_term_ref_pic_id_delta_minus1[ cIdx ] −
        1
}
for( i = 0, pocPred = PicOrderCnt( CurrPic ); i < num_short_term_foll1; pocPred =
RefPicSetStFoll[ i ], i++, cIdx++ )
{
    RefPicSetStFoll1[ i ] = short_term_ref_pic_id_delta_minus1[ cIdx ] + 1 −
        pocPred
}
```

For the long-term reference pictures, video encoder 20 may signal identifiers (e.g., full POC values) for a list of candidate long-term reference pictures in the picture parameter set. Candidate long-term reference pictures refer to long-term reference pictures that may potentially belong to the reference picture set, but do not necessarily have to belong to the reference picture set. One example of the list of candidate long-term reference pictures is the long_term_ref_pic_id_pps[i] syntax element in the picture parameter set.

It should be understood that video encoder 20 may optionally signal the full POC values for candidate long-term reference pictures in the sequence parameter set as well. For purposes of illustration, the techniques are described with examples where video encoder 20 signals the full POC values for the candidate long-term reference pictures in the picture parameter set.

Video encoder 20 may signal an index into the list of candidate long-term reference pictures that indicate which long-term reference pictures belong in the reference picture set. For instance, Table 5 includes the long_term_ref_pic_set_idx_pps syntax element that specifies an index into the list of candidate long-term reference pictures that video decoder 30 is to inherit for purposes of deriving the reference picture set.

Moreover, there may be long-term reference pictures that are not in the list of candidate long-term reference pictures that belong to the reference picture set. For instance, Table 5 includes the long_term_ref_pic_id_delta_add syntax element. This syntax element indicates long-term reference pictures that are to be included in the reference picture set of the current picture, but are not specified in the picture parameter set.

Table 5 also includes the num_long_term_pps_curr, num_long_term_add_curr, num_long_term_pps_foll, and num_long_term_add_foll syntax elements. These syntax elements indicate the number of long-term reference pictures that are to be included in the RefPicSetLtCurr and RefPicSetLtFoll reference picture subsets. For example, the sum of the value of num_long_term_pps_curr and num_long_term_add_curr indicates the number of long-term reference pictures that are to be included in the RefPicSetLtCurr reference picture subset. The sum of the value of num_long_term_pps_foll and num_long_term_add_foll indicates the number of long-term reference pictures that are to be included in the RefPicSetLtFoll reference picture subset.

In some other techniques, video encoder 20 may signal all of these syntax elements of Table 5 even if video decoder 30 did not need any long-term reference pictures for inter-predicting the current picture. For example, because the reference picture set may identify the reference pictures that can be used for inter-predicting the current picture and pictures following the current picture in decoding order, even if video decoder 30 did not need to utilize any long-term reference pictures for inter-predicting, these other techniques may still signal these syntax elements for the long-term reference pictures because pictures following the current picture in decoding order may utilize the long-term reference pictures.

As an illustrative example, assume that video encoder 20 signaled three long-term reference pictures in the picture parameter set. In some examples, many of the pictures may not use any of these long-term reference pictures for inter-prediction. However, in these other techniques, even if video decoder 30 does not need any of these long-term reference pictures for inter-predicting the current picture, video encoder 20 may still signal syntax elements for all three of the long-term reference pictures in the slice header of the current picture because video decoder 30 may need these long-term reference pictures for inter-predicting pictures following the current picture in decoding order. In these other techniques, if video encoder 20 did not signal the long-term reference pictures, video decoder 30 may determine that these long-term reference pictures are not need for inter-prediction anymore and may remove these reference pictures from the DPB.

Such unnecessary signaling of syntax elements for long-term reference pictures that are not needed for inter-predicting the current picture consume bandwidth. Furthermore, the signaling overhead for long-term reference pictures may already be high and complicated as video decoder 20 may need to signal index values into candidate list of long-term reference pictures and signal POC values for long-term reference pictures that are not in the list of candidate long-term reference pictures.

To address this, video encoder 20 may signal a value that indicates whether video decoder 30 needs to utilize any long-term reference pictures for inter-predicting the current picture. This value further indicates that pictures following the current picture decoding order are not inter-predicted with reference to a long-term reference picture.

For instance, Table 5 includes the long_term_not_used_flag. When this flag is true, no long-term reference picture is used for inter-prediction of the current picture as well as pictures following the current picture in decoding order. This flag equal to 0 indicates that video encoder 20 may signal the use of long-term reference pictures using the syntax elements in the long-term reference picture set syntax of Table 5, such as the num_long_term_pps_curr, num_long_term_add_curr, num_long_term_pps_foll, num_long_term_add_foll, long_term_ref_pic_set_idx_pps, and long_term_ref_pic_id_delta_add syntax elements.

In some examples, when the long_term_not_used_flag is true (e.g., a value of 1), video encoder 20 may not signal the syntax elements that indicate which long-term reference pictures belong in the reference picture set of the current picture because video decoder 30 does not need any long-term reference pictures for inter-predicting the current picture. For example, when the long_term_not_used_flag is true, video encoder 20 may not signal the num_long_term_pps_curr, num_long_term_add_curr, num_long_term_pps_foll, num_long_term_add_foll, long_term_ref_pic_ set_idx_ pps, and long_term_ref_pic_id_delta_add syntax elements.

Furthermore, the long_term_not_used_flag being true indicates to video decoder 30 that no picture following the current picture in decoding order uses a long-term reference picture for inter-predicting. In some examples, when the value of the long_term_not_used_flag is 1, video decoder 30 may remove the long-term reference pictures from the DPB, if no longer needed for output, because the current picture and the pictures following the current picture in decoding order do not use long-term reference pictures for inter-predicting.

In accordance with the techniques described in this disclosure, if the long_term_not_used_flag is false (e.g., a value of 0), then video encoder 20 may signal another value that indicates that all long-term reference pictures specified in the referred parameter set may be used for inter-prediction of the current picture. For example, Table 5 indicates that "if (!long_term_not_used_flag)" (i.e., long_term_not_used_flag is false), video encoder 20 may signal the long_term_reuse_pps_flag. When the long_term_reuse_pps_flag is true (e.g., a value of 1), all long-term reference pictures as specified in the referred picture parameter set can be used for prediction of the current picture, and no long-term reference pictures not indicated in the referred PPS can be used for inter prediction of the current picture or pictures following the current picture in decoding order.

In some examples, when the long_term_reuse_pps_flag is true, video encoder 20 may not signal the num_long_term_pps_curr, num_long_term_add_curr, num_long_term_pps_foll, num_long_term_add_foll, long_term_ref_pic_ set_idx_ pps, and long_term_ref_pic_id_delta_add syntax elements. This may be because long_term_reuse_pps_flag being true indicates that all long-term reference pictures in the referred picture parameter set can be used for inter-predicting the current picture. Therefore, there may not be a need to signal an index into the candidate list, resulting in the long_term_ ref_pic_set_idx_pps syntax element being superfluous. Because the long_term_ref_pic_set_idx_pps syntax element is not needed, the num_long_term_pps_curr and the num_ long_term_pps_foll syntax elements are not needed.

Also, long_term_reuse_pps_flag being true indicates that no long-term reference pictures that are not indicated in the referred PPS may be used for inter-prediction of the current picture or pictures following the current picture in decoding order. This means that the long_term_ref_pic_id_delta_add syntax element is not needed. For instance, the long_term_ref_pic_id_delta_add syntax element indicates long-term reference pictures that are not specified in the referred PPS but belong to the reference picture set. However, when the long_term_reuse_pps_flag is true, no reference picture not included in the referred PPS is used for inter-predicting the current picture or pictures following the current picture in decoding order, meaning that there is no value for the long_term_ref_pic_id_delta_add syntax element. Because there is no need for video encoder 20 to signal the long_term_ref_pic_id_delta_add syntax element, there may be no need for video encoder 20 to signal the num_long_term_add_curr and num_long_term_add_foll syntax elements.

It should be understood that although both the long_term_not_used_flag, and the long_term_reuse_pps_flag are described in this disclosure, aspects of this disclosure are not so limited. In some examples, the long-term reference picture set syntax may include the long_term_not_used_flag, but may not include the long_term_reuse_pps_flag. In some examples, the long-term reference picture set syntax may include the long_term_reuse_pps_flag, but may not include the long_term_not_used_flag.

As indicated in Table 5, in instances where both the long_term_not_used_flag and the long_term_reuse_pps_flag are not true, video encoder 20 may signal the num_long_term_pps_curr, num_long_term_add_curr, num_long_ term_pps_foll, num_long_term_add_foll, long_term_ref_ pic_set_idx_pps, and long_term_ref_pic_id_ delta_add syntax elements. For example, when both long_ term_not_used_flag and the long_term_reuse_pps_flag are not true, then there may be long-term reference pictures that video decoder 30 needs to utilize for inter-predicting the current picture, and there may be long-term reference pictures that are not included in the referred picture parameter set that video decoder 30 may need to utilize for inter-predicting the current picture or pictures following the current picture in decoding order.

As described above, video decoder 30 may implement the above pseudo code to construct the RefPicSetStCurr0, RefPicSetStCurr1, RefPicSetStFoll0, and RefPicSetStFoll1 reference picture subsets. The following describes the manner in which video decoder 30 may construct the RefPicSetLtCurr and RefPicSetLtFoll reference picture subsets.

If the slice header indicates that long_term_ref_pics_present_flag is false (e.g., a value of 0), video decoder 30 may set the RefPicSetLtCurr and RefPicSetLtFoll reference picture subsets to empty. Otherwise, given an instance of the long_term_ref_pic_set( ) syntax structure in the slice header, video decoder 30 may construct the RefPicSetLtCurr and RefPicSetLtFoll reference picture subsets as follows:

If long_term_not_used_flag is true (e.g., a value of 1), video decoder 30 may set the RefPicSetLtCurr reference picture subset to empty and set the RefPicSetLtFoll reference picture subset to empty. This indicates that there are no reference pictures included in the RefPicSetLtCurr and RefPicSetLtFoll reference picture subsets. Otherwise, if long_term_not_used_flag is false (e.g., a value of 0), and long_term_reuse_pps_flag is true (e.g., a value of 1), video decoder 30 may include all of the long-term reference pictures in the picture parameter set in the RefPicSetLtCurr reference picture subset. In this case, video decoder 30 may set the RefPicSetLtFoll reference picture subset to empty.

Video decoder 30 may implement the following pseudo code to construct the RefPicSetLtCurr reference picture subset.

```
for (i = 0; i < num_long_term_ref_pics_pps; i++)
{
    RefPicSetLtCurr[i] = long_term_ref_pic_id_ pps[i]
}
```

Otherwise (i.e., both long_term_not_used_flag and long_term_reuse_pps_flag are false), video decoder 30 may construct the RefPicSetLtCurr reference picture subset as indicated in the following pseudo code.

```
cIdx = 0
for( i = 0; i < num_long_term_pps_curr; i++, cIdx++ )
{
    pIdx = long_term_ref_pic_idx_pps[ i ]
    RefPicSetLtCurr[ cIdx ] = long_term_ref_pic_id_ pps[ pIdx ]
}
for( i = 0; i < num_long_term_add_curr; i++, cIdx++ )
{
    picIdDelta = long_term_ref_pic_id_delta_add[ i ]
    RefPicSetLtCurr[ cIdx ] = PicOrderCnt( CurrPic ) − picIdDelta
}
```

Also, when both long_term_not_used_flag and long_term_reuse_pps_flag are false, video decoder 30 may construct the RefPicSetLtFoll reference picture subset as indicated in the following pseudo code.

```
cIdx = 0
for( i = 0; i < num_long_term_pps_foll; i++, cIdx++ )
{
    pIdx = long_term_ref_pic_idx_pps[ i +
    num_long_term_pps_curr ]
    RefPicSetLtFoll[ cIdx ] = long_term_ref_pic_id_ pps[ pIdx ]
}
for( i = 0;i < num_long_term_add_foll; i++, cIdx++ )
{
    picIdDelta = long_term_ref_pic_id_delta_add[ i +
    num_long_term_add_curr]
    RefPicSetLtFoll[ cIdx] = PicOrderCnt( CurrPic ) − picIdDelta
}
```

The above describes one example manner in which video encoder 20 may signal information for long-term reference pictures, and the manner in which video decoder 30 may construct reference picture subsets of the reference picture set, including reference picture subsets that include the long-term reference pictures. However, aspects of this disclosure are not so limited. The following describes another example of the long-term reference picture set syntax that is part of the slice header.

TABLE 6

Long-term reference picture set syntax

| long_term_ref_pic_set( ) { | Descriptor |
|---|---|
|   long_term_pps_curr_flag | u(1) |
|   if( !long_term_pps_curr_flag ) | |
|     long_term_pps_foll_flag | u(1) |
|   if( !long_term_pps_curr_flag && | |
|   ! long_term_pps_foll_flag ) { | |
|     num_long_term_pps_curr | ue(v) |
|     num_long_term_pps_foll | ue(v) |
|     for( i = 0; i < num_long_term_pps_curr + | |
|     num_long_term_ pps_foll; i++ ) | |
|       long_term_ref_pic_set_idx_pps[ i ] | ue(v) |
|   } | |
|   num_long_term_add_curr | ue(v) |
|   num_long_term_add_foll | ue(v) |
|   for( i = 0; i < num_long_term_add_curr + | |
|   num_long_term _add_foll; i++ ) | |
|     long_term_ref_pic_id_delta_add[ i ] | i(v) |
| } | |

The long-term reference picture set syntax of Table 6 includes the long_term_pps_curr_flag and the long_term_pps_foll_flag.

long_term_pps_curr_flag equal to 1 indicates that all long-term reference pictures as specified in the referred picture parameter set may be used for prediction of the current picture. This flag equal to 1 indicates that use of long-term reference pictures for the current picture is signaled by the remaining syntax elements of the long-term reference picture set syntax table.

When long_term_pps_curr_flag is equal to 1, num_long_term_pps_curr and num_long_term_pps_foll are inferred to be equal to num_long_term_ref_pics_pps and 0, respectively, and long_term_ref_pic_idx_pps[i] is inferred to be i, for all i values in the range of 0 to num_long_term_ref_pics_pps−1, inclusive.

long_term_pps_foll_flag equal to 1 indicates that no long-term reference picture is used for inter-prediction of the current picture, and all long-term reference pictures indicated in the referred picture parameter set (PPS) may be used for inter-prediction of pictures following the current picture in decoding order. This flag equal to 0 indicates that use of long-term reference pictures is signaled by the remaining syntax elements of the long-term reference picture set syntax table. When long_term_pps_foll_flag is not present, the value may be inferred as equal to 0.

When long_term_pps_foll_flag is equal to 1, num_long_term_pps_curr and num_long_term_pps_foll are inferred to be 0, and num_long_term_ref_pics_pps, respectively, and long_term_ref_pic_idx_pps[i] is inferred to be i, for all i values in the range of 0 to num_long_term_ref_pics_pps−1, inclusive.

The long_term_pps_curr_flag and the long_term_pps_foll_flag, of Table 6, may allow video encoder 20 to not signal the long_term_ref_pic_set_idx_pps index values, and the num_long_term_pps_curr and num_long_term_pps_foll syntax elements in certain cases. In these cases, video decoder 30 may not need to inherit any of the reference pictures in the list of candidate long-term reference pictures of the picture parameter set.

For example, when long_term_pps_curr_flag is true (e.g., a value of 1), video decoder 30 may determine that all long-term reference pictures in the referred picture parameter set can be used for inter-predicting the current picture. In this case, signaling index values into the list of candidate long-term reference pictures may not be needed because all long-term reference pictures in the list of candidate long-term reference pictures can be used for inter-predicting the current picture. Therefore, when long_term_pps_curr_flag is true, video encoder 20 may not need to signal and video decoder 30 may not need to receive the long_term_ref_pic_set_idx_pps syntax element. Because video encoder 20 may not need to signal and video decoder 30 may not need to receive the long_term_ref_pic_set_idx_pps syntax element, video encoder 20 may not need to signal and video decoder 30 may not need to receive the num_long_term_pps_curr and num_long_term_pps_foll syntax elements.

Also, when long_term_pps_foll_flag is true (e.g., a value of 1), video decoder 30 may determine that no long-term reference picture in the referred picture parameter set can be used for inter-predicting the current picture, and all long-term reference pictures can be used for inter-predicting pictures following the current picture in decoding order. In this case, signaling index values into the list of candidate long-term reference pictures may not be needed because all long-term reference pictures in the list of candidate long-term reference pictures can be used for inter-predicting pictures following the current picture in decoding order. Therefore, similar to above, when long_term_pps_foll_flag is true, video encoder 20 may not need to signal and video decoder 30 may not need to receive the long_term_ref_pic_set_idx_pps syntax element. Because video encoder 20 may not need to signal and video decoder 30 may not need to receive the long_term_ref_pic_set_idx_pps syntax element, video encoder 20 may not need to signal and video decoder 30 may not need to receive the num_long_term_pps_curr and num_long_term_pps_foll syntax elements.

In examples where video encoder 20 signals and video decoder 30 receives the long-term reference picture set syntax in the example of Table 6, video encoder 20 and video decoder 30 may construct the short-term reference picture subsets (e.g., the RefPicSetStCurr0, RefPicSetStCurr1, RefPicSetStFoll0, and RefPicSetStFoll1 reference picture subsets) as described above. For constructing the long-term reference picture subsets (e.g., the RefPicSetLtCurr and RefPicSetLtFoll reference picture subsets), video encoder 20 and video decoder 30 may implement the following.

```
cIdx = 0
for( i = 0; i < num_long_term_pps_curr; i++, cIdx++ )
{
    pIdx = long_term_ref_pic_idx_pps[ i ]
    RefPicSetLtCurr[ cIdx ] = long_term_ref_pic_id_ pps[ pIdx ]
}
for( i = 0; i < num_long_term_add_curr; i++, cIdx++ )
{
    picIdDelta = long_term_ref_pic_id_delta_add[ i ]
    RefPicSetLtCurr[ cIdx ] = PicOrderCnt( CurrPic ) - picIdDelta
}
cIdx = 0
for( i = 0; i < num_long_term_pps_foll; i++, cIdx++ )
{
    pIdx = long_term_ref_pic_idx_pps[ i +
    num_long_term_pps_curr ]
    RefPicSetLtFoll[ cIdx ] = long_term_ref_pic_id_ pps[ pIdx ]
}
for( i = 0;i < num_long_term_add_foll; i++, cIdx++ )
{
    picIdDelta = long_term_ref_pic_id_delta_add[ i +
    num_long_term_add_curr]
    RefPicSetLtFoll[ cIdx] = PicOrderCnt( CurrPic ) - picIdDelta
}
```

As indicated in the above derivation of RefPicSetLtCurr and RefPicSetLtFoll reference picture subsets, video encoder 20 and video decoder 30 may utilize the long_term_ref_pic_idx_pps syntax element to construct the RefPicSetLtCurr and RefPicSetLtFoll reference picture subsets. However, if the long_term_pps_curr_flag is false (e.g., a value of 0), and the long_term_pps_foll_flag is false (e.g., a value of 0), then video encoder 20 may not signal the long_term_ref_pic_idx_pps syntax element. In these cases, video encoder 20 and video decoder 30 may infer the value of the long_term_ref_pic_idx_pps syntax element. For instance, video encoder 20 and video decoder 30 may infer the value of long ref_pic_idx_pps[i] as equal to i, for all values in the range of 0 to num_long_term_ref_pics_pps−1, inclusive.

It should be understood that although the example syntax of Table 6 includes both the long_term_pps_curr_flag and the long_term_pps_foll_flag, aspects of this disclosure are not so limited. In other examples, video encoder 20 may signal the long_term_pps_curr_flag, and not signal the long_term_pps_foll_flag. In other examples, video encoder 20 may signal the long_term_pps_foll_flag, and not signal the long_term_pps_curr_flag.

The above describes examples ways in which video encoder 20 may signal and video decoder 30 may receive information for long-term reference pictures that can be used for inter-predicting a current picture and/or pictures following the current picture in decoding order. For example, video encoder 20 and video decoder 30 may be configured to implement the example techniques described above with respect to Table 5. In other examples, video encoder 20 and video decoder 30 may be configured to implement the example techniques described above with respect to Table 6.

For instance, a video coder (e.g., video encoder 20 or video decoder 30) may be code a value of a flag that indicates whether long long-term reference pictures can be used for inter-predicting the current picture and pictures following the current picture in decoding order. For example, the video coder may code the value for the long_term_not_used_flag in the slice header of the slice of the current picture.

When the value of the flag is a first value, the video coder may inter-predicting the current picture utilizing only one or more short-term reference pictures. For example, when the value of the long_term_not_used_flag is 1 (e.g., true), then the video coder cannot use long-term reference pictures for inter-predicting the current picture and pictures following the current picture in decoding order. In this example, the video coder may set the RefPicSetLtCurr and RefPicSetLtFoll reference picture subsets to empty.

Also, in this example, the video coder may construct at least one short-term reference picture subset (e.g., at least one of RefPicSetStCurr0, RefPicSetStCurr1, RefPicSetStFoll0, and RefPicSetStFoll1 reference picture subsets). The video coder may inter-predict the current picture utilizing one or more of the short-term reference pictures included in the at least one short-term reference picture subset.

In some examples, the video coder may further code a value of another flag. For example, if the long_term_not_use_flag is false (e.g., value is 0), the video coder may code the long_term_reuse_pps_flag. In this example, the long_term_not_use_flag begin the value of 0 indicates that long-term reference pictures can be used for inter-predicting the current picture and pictures following the current picture in decoding order. As described above, the long_term_reuse_pps_flag indicates whether all long-term reference pictures specified in a parameter set (e.g., the referred picture parameter set) can be used for inter-prediction of the current picture, and whether long-term reference pictures that are not specified in the parameter set and that are prior to the current picture in decoding order can be used for inter-prediction of the current picture or the pictures following the current picture in decoding order.

When the value of the long_term_reuse_pps_flag is 1 (e.g., true), the long_term_reuse_pps_flag indicates that all long-term reference pictures specified in a parameter set can be used for inter-prediction of the current picture, and long-term reference pictures that are not specified in the parameter set and that are prior to the current picture in decoding order cannot be used for inter-prediction of the current picture or the pictures following the current picture in decoding order. When long_term_reuse_pps_flag is 1, the video coder may construct a long-term reference picture subset (e.g., RefPicSetLtCurr) that includes all long-term reference pictures that can be used for reference in inter-prediction of the current picture, and that can be used for reference in inter-prediction of pictures following the current picture in decoding order. In these examples, the video coder may construct the RefPicSetLtCurr reference picture subset without coding an index into the parameter set.

For example, the long_term_ref_pic_set_idx_pps[i] syntax element may provide an index into the list of candidate long-term reference pictures (e.g., an index into the long-term reference pictures specified in the picture parameter set). In examples where long_term_reuse_pps_flag is 1, the video coder may be able to construct the RefPicSetLtCurr reference picture subset without coding the long_term_ref_pic_set_idx_pps[i] syntax element.

When the value of the long_term_not_used_flag and the long_term_reuse_ppg_flag are both 0 (e.g. false), this may indicate that the current picture and pictures following the current picture in decoding order can be inter-predicted with long-term reference pictures, that not all long-term reference pictures specified in the parameter set can be used for inter-prediction of the current picture, and that long-term reference pictures that are not specified in the parameter set and that are prior to the current picture in decoding order can be used for inter-prediction of the current picture and pictures following the current picture in decoding order. In this case, the video coder may construct both the RefPicSetLtCurr and RefPicSetLtFoll reference picture subsets. In some examples, the video coder may code at least one index into the parameter set (e.g., the index into the specified long-term reference pictures), and may construct the RefPicSetLtCurr and RefPicSetLtFoll reference picture subsets based on the at least one index.

In some other examples, the video coder may code a value of a flag, in a slice header for a slice of a current picture, that indicates whether all long-term reference pictures specified in the parameter set can be used for inter-prediction for the current picture. For example, the video coder may code the long_term_pps_curr_flag.

When the value of the long_term_pps_curr_flag is a first value (e.g., 1), this may indicate that all long-term reference pictures specified in the parameter set can be used for inter-prediction for the current picture. In this case, the video coder may inter-predict the current picture utilizing a long-term reference picture specified in the parameter set without coding an index into the parameter set for the specified long-term reference pictures (e.g., without coding the long_term_ref_pic_set_idx_pps[i] syntax element which provides an index into the list of candidate long-term reference pictures).

For example, when the value of the long_term_pps_curr_flag is 1, the video coder may determine that the long-term reference picture can be used for inter-predicting the current picture. The video coder may further determine that the long-term reference picture is to be used for inter-predicting the current picture. In this case, the video coder may inter-predict the current picture utilizing the long-term reference picture based on the determination that the long-term reference picture is to be used for inter-predicting the current picture.

In some examples, the video coder may further code the long_term_pps_foll_flag, when the value of long_term_pps_curr_flag is 0. When long_term_pps_curr_flag is 0, and when the long_term_pps_foll_flag indicates that no long-term reference picture is used for inter prediction of the current picture, and all long-term reference pictures indicated in the parameter set can be used for inter prediction of pictures following the current picture in decoding order, the video coder may inter-predict the current picture utilizing one or more long-term reference pictures that are not specified in the parameter set, and not utilize any of the long-term reference pictures that are specified in the parameter set.

In some examples, the techniques described in this disclosure may be directed to decoded picture buffer (DPB) management. The DPB may be a buffer that stores decoded pictures.

Each of video encoder 20 and video decoder 30 may include respective DPBs. For example, as part of the encoding process, video encoder 20 may decode a current picture, store the decoded picture in the DPB of video encoder 20, and utilize the decoded picture stored in the DPB for inter-predicting a subsequent picture. Similarly, as part of the decoding process, video decoder 30 may decode a current picture and store the decoded picture in the DPB of video decoder 30. Video decoder 30 may then utilize the decoded picture for inter-predicting a subsequent picture.

In some examples, the DPB for either video encoder 20 or video decoder 30 may store decoded pictures for output reordering or output delay. For example, video decoder 30 may determine that the decoded pictures should be reordered for outputting or that the output of a decoded picture should be delayed. In these examples, the DPB of video decoder 30 may store the decoded pictures for output reordering or output delay.

The DPB management techniques described in this disclosure may be directed to the manner in which the DPB outputs and removes decoded pictures. The output_flag syntax element may affect the decoded picture output and removal process, and may be defined as part of the network abstraction layer (NAL) unit semantics. A NAL unit may be defined as a syntax structure that includes an indication of the type of data to follow and bytes that include that data in the form of a raw byte sequence payload (RBSP) interspersed as necessary with emulation prevention bytes. The RBSP may be a syntax structure that includes an integer number of bytes that is encapsulated in a NAL unit. An RBSP may be either empty or has the form of a string of data bits that include syntax elements followed by an RBSP stop bit and followed by zero or more subsequent bits equal to 0. Table 7 defines the NAL unit syntax.

TABLE 7

| NAL unit syntax | |
|---|---|
| nal_unit( NumBytesInNALunit ) { | Descriptor |
|   forbidden_zero_bit | f(1) |
|   nal_ref_idc | u(2) |
|   nal_unit_type | u(5) |

TABLE 7-continued

NAL unit syntax

| nal_unit( NumBytesInNALunit ) { | Descriptor |
|---|---|
|   NumBytesInRBSP = 0 | |
|   nalUnitHeaderBytes = 1 | |
|   if( nal_unit_type = = 1 \|\| | |
|   nal_unit_type = = 4 \|\| nal_unit_type = = 5 ) { | |
|     temporal_id | u(3) |
|     output_flag | u(1) |
|     reserved_one_4bits | u(4) |
|     nalUnitHeaderBytes += 1 | |
|   } | |
|   for( i = nalUnitHeaderBytes; | |
|   i < NumBytesInNALunit; i++ ) { | |
|     if( i + 2 < NumBytesInNALunit && | |
|     next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

In Table 7, the output_flag may affect the decoded picture output and removal process as described in more detail below. For any picture, if output_flag is equal to 1, the picture is intended for output. Otherwise, the picture is never outputted. In the techniques described in this disclosure, the variable OutputFlag is equal to the output_flag syntax element.

In some examples, any coded slice NAL unit of the coded picture of the current access unit may be different from any coded slice NAL unit of the coded picture of the previous access unit in one or more of the following ways. For example, the pic_parameter_set_id values may be different, the nal_ref_idc values may be different, with one of the nal_ref_idc values being equal to 0. The pic_order_cnt_lsb values may be different. The IdrPicFlag values may be different. The IdrPicFlag may be equal to 1 for both, and the idr_pic_id values may be different.

In the techniques described in this disclosure, the access unit may be defined as a set of NAL units that are consecutive in decoding order and contain one coded picture. In addition to the coded picture one auxiliary coded picture, or other NAL units may not contain slices of a coded picture. In some examples, the decoding of an access unit may result in a decoded picture. The coded picture may be the coded representation of a picture to be used by the decoding process.

As indicated in Table 4, the slice header syntax may include the pic_parameter_set_id syntax element, the pic_order_cnt_lsb syntax element, the IdrPicFlag syntax element, and the idr_pic_id syntax element. As indicated in Table 7, the NAL unit syntax may include the nal_ref_idc syntax element.

For purposes of illustration, the DPB management techniques are described from the perspective of a hypothetical reference decoder (HRD). The HRD may be defined as a hypothetical decoder model that specifies constraints on the variability of conforming NAL unit streams or conforming byte streams that an encoding process may produce. However, in accordance with the techniques described in this disclosure, video decoder 30 may implement the DPB management techniques, and in some examples, it may be possible for video encoder 20 to also implement the DPB management techniques.

The HDR model may define a coded picture buffer (CPB), an instantaneous decoding process, and a decoded picture buffer (DPB). The CPB may be similar to the CPB of HDR models defined in other previous standards (i.e., the CPB may store coded pictures). The techniques described in this disclosure are directed to the DPB operations which are different than operations in other standards. Again, it should be understood that video decoder 30 and possibly video encoder 20 may implement the DPB operations as described below.

In general, in the techniques described in this disclosure are related to outputting and removal of decoded pictures in the DPB. Outputting of a decoded picture, in this context, means outputting of the decoding picture for display, storage or other purposes. However, a decoded picture that is outputted need not necessarily be removed from the DPB. For example, video decoder 30 may not remove a decoded picture that is outputted from the DPB because video decoder 30 may need to utilize that decoded picture as a reference picture for inter-predicting a subsequent picture. Removal of a decoded picture, in this context, means the removal of the decoded picture from the DPB.

For instance, video decoder 30 may store decoded pictures in the DPB of video decoder 30 in the order in which the picture are decoded. However, the decoding order of the pictures may not be the same as the output order of the pictures. For example, there may be pictures subsequent to a current picture in decoding order that are to be outputted earlier than the current picture. Accordingly, in some examples, video decoder 30 may perform reordering by which video decoder 30 reorders pictures in the DPB that are ordered in decoding order into output order. Video decoder 30 may then output the decoded pictures in their output order. Video decoder 30 may also remove pictures from the decoded picture if the picture is not needed for output (i.e., it has been outputted or is not intended for output) and is not needed for inter-prediction (i.e., not needed to be used as a reference picture for inter-prediction).

In the techniques described in this disclosure, video decoder 30 may remove a decoded picture from the DPB if the following criteria is met: (1) the decoded picture is not identified in the derived reference picture set, (2) the decoded picture is not needed for output (i.e., it has been outputted or is not intended for output), and (3) the temporal identification value (temporal_id) of the picture is less than or equal to the temporal identification value of the current picture. As described above, the temporal identification value (temporal_id) may be hierarchical value that indicates which pictures can be used for inter-predicting the current picture. A picture with a particular temporal_id value can be a reference picture for pictures with equal or greater temporal_id values, but not vice-versa. For example, a picture with a temporal_id value of 1 can possibly be a reference picture for pictures with temporal_id values of 1, 2, 3, . . . , but not for a picture with a temporal_id value of 0.

Again, as described above, the reference picture set may identify reference pictures that can be used to inter-predict the current picture, and that can be used to inter-predict one or more pictures following the current picture in decoding order. In some cases, the reference picture set of the current picture may be constricted to identify only those reference pictures whose temporal_id value is less than or equal to that of the current picture.

In some other techniques, if the temporal_id value of a decoded picture in the DPB is greater than the temporal_id value of the current picture, that decoded picture is removed from the DPB when not needed for output. However, the removed picture may be a best candidate for inter-predicting another picture whose temporal_id value is greater than or equal to the temporal_id value of the removed picture. In this case, video decoder 30 may not be able to use the best candidate for inter-predicting this picture whose temporal_id value is greater than or equal to the temporal_id value of the removed picture.

In accordance with the techniques described in this disclosure, the example criteria described above may ensure that decoded pictures whose temporal_id value is greater than that of the current picture remain the DPB so that such pictures are available for inter-predicting subsequent pictures. For instance, even if a decoded picture is not identified in the derived reference picture set, and even if the decoded picture is not needed for output, video decoder 30 may not remove the decoded picture from its DPB if the temporal_id value of the decoded picture is greater than that of the current picture. In this way, even if the reference picture set of the current picture does not identify any pictures whose temporal_id value is greater than that of the current picture, video decoder 30 may not remove a decoded picture whose temporal_id value is greater than that of the current picture.

Furthermore, in the techniques described in this disclosure, video decoder 30 may remove a decoded picture prior to the decoding of a current picture. For example, as described above, video decoder 30 may derive a reference picture set. Because video decoder 30 may derive the reference picture set prior to decoding the current picture, video decoder 30 may be configured to determine whether a decoded picture that is not needed for output should be removed prior to decoding the current picture. For example, after deriving the reference picture set and prior to decoding the current picture, video decoder 30 may identify a decoded picture that is not needed for output, that is not identified in the reference picture set of the current picture, and whose temporal_id value is less than or equal to that of the current picture. Then, prior to decoding the current picture, video decoder 30 may remove the identified decoded picture from the DPB.

The DPB may include a plurality of buffers, and each buffer may store a decoded picture that is to be used as a reference picture or is held for future output. Initially, the DPB is empty (i.e., the DPB fullness is set to zero).

This disclosure describes the removal techniques of decoded pictures in the DPB from at least two perspectives. In the first perspective, video decoder 30 may remove decoded pictures based on an output time if the pictures are intended for output. In the second perspective, video decoder 30 may remove decode pictures based on the POC values if the pictures are intended for output. In either perspectives, video decoder 30 may remove decoded pictures that are not needed for output (i.e., outputted already or not intended for output) when the decoded picture is not in the reference picture set, and prior to decoding the current picture.

In the first perspective, the following techniques may occur instantaneously at time $t_r(n)$ in the following sequence. In this example, $t_r(n)$ is CPB removal time (i.e., decoding time) of the access unit n containing the current picture. As described in this disclosure, the techniques occurring instantaneously may means that the in the HDR model, it is assumed that decoding of a picture is instantaneous (i.e., unlimited fast) with a time period for decoding a picture equal to zero.

If the current picture is an IDR picture, and when the IDR picture is not the first IDR picture and the value of value of pic_width_in_luma_samples or pic_height_in_luma_samples or max_dec_frame_buffering derived from the active sequence parameter set is different from the value of pic_width_in_luma_samples or pic_height_in_luma_samples or max_dec_frame_buffering derived from the sequence parameter set that was active for the preceding picture, respectively, video decoder 30 may infer that the no_output_of_prior_pics_flag syntax element is equal to 1, regardless of the actual value of no_output_of_prior_pics_flag. If the current picture is an IDR picture, and when no_output_of_prior_pics_flag is equal to 1 or is inferred to be equal to 1, video decoder 30 may empty all buffers of the DPB without outputting the pictures in the DPB, and may set the DPB fullness to 0.

As indicated above in Table 1, the sequence parameter set may include the pic_width_in_luma_samples, and the pic_height_in_luma_samples syntax elements. The sequence parameter set may also include the max_dec_frame_buffering syntax element. As indicated above in Table 4, the slice header syntax may include the no_output_of_prior_pics_flag syntax element.

When the current picture is not an IDR picture, video decoder 30 may remove all pictures (m) in the DPB for which the following conditions are true. The first condition may be that the picture is not included in the reference picture set of the current picture. The second condition may be that the picture has an OutputFlag equal to 0 or its DPB output time is less than or equal to the CPB removal time of the current picture. In this example, the CPB removal time is $t_r(n)$, which the instance at which the removal process occurs (e.g., a time prior to the decoding of the current picture). The DPB output time of a decoded picture m may be defined by the variable $t_{o,dpb}(m)$. Therefore, the DPB output time being less than or equal to the CPB removal time may be represented as $t_{o,dpb}(m) \le t_r(n)$. The derivation of the DPB output time ($t_{o,dpb}$) is defined in more detail below. The third condition may be that the temporal_id of the picture is less than or equal to the temporal_id of the current picture.

In this manner, video decoder 30 may remove decoded pictures from the DPB, prior to decoding a picture, based on the output time of the decoded picture, whether the decoded picture is identified in the reference picture set, and the temporal_id value of the decoded picture. When video decoder 30 removes a decoded picture from the DPB, video decoder 30 may decrement the DPB fullness by one.

The following describes the manner in which video decoder 30 may determine a time when to output the decoded picture (e.g., the DPB output time of a decoded picture), and also describes when video decoder 30 may store the decoded picture in the DPB. As described above, the DPB output time of the picture may be a factor in determining whether or not that picture is removed from the DPB.

When video decoder 30 decodes a picture, video decoder 30 stores the picture in the DPB, and increments the DPB fullness by one. When the picture has an OutputFlag equal to 1, video decoder 30 may derive the DPB output time for the picture based on the following equation.

$$t_{o,dpb}(n) = t_r(n) + t_c * \text{dpb\_output\_delay}(n)$$

In the equation, dpb_output_delay(n) may be specified in the picture timing SEI message associated with the access unit that includes the picture. The SEI message is generally well established and described in standards such as the H.264/AVC standard.

The $t_{o,dpb}(n)$ value may define when a picture is to be outputted. For example, if OutputFlag is equal to 1 and $t_{o,dpb}(n)$ equals $t_r(n)$, video decoder 30 may output the picture. Otherwise, if OutputFlag is equal to 0, video decoder 30 may not output the picture. In instances where OutputFlag equals 1 and $t_{o,dpb}(n)$ is greater than $t_r(n)$, video decoder 30 may output the picture at a later time (e.g., at time $t_{o,dpb}(n)$).

In some examples, when video decoder 30 outputs a picture, video decoder 30 may crop the picture. For example, video decoder 30 may utilize the cropping rectangle specified in the active sequence parameter set for the picture. The techniques for cropping the picture are generally well established and described in standards such as the H.264/AVC standard.

In some examples, video decoder 30 may determine a difference between the DPB output time for a picture and the DPB output time for a picture following the picture in output order. For example, when picture (n) is a picture that video decoder 30 outputs, and is not the last picture of the bitstream that is output, video decoder 30 may determine the value of $\Delta t_{o,dpb}(n)$ is defined as:

$$\Delta t_{o,dpb}(n) = t_{o,dpb}(n_n) - t_{o,dpb}(n)$$

In the above equation, $n_n$ indicates the picture that follows after the picture (n) in output order and has OutputFlag equal to 1. Also, in the above equation, $\Delta t_{o,dpb}(n)$ represents the difference in the DPB output times between a picture and the following picture in output order.

In the second perspective for removing decoded pictures, the HDR may implement the techniques instantaneously when an access unit is removed from the CPB. Again, video decoder 30 may implement the removing of decoded pictures from the DPB, and video decoder 30 may not necessarily include the CPB. In general, in this disclosure, the removal of decoded pictures is performed by video decoder 30, and may also be performed by video encoder 20. In these examples, video decoder 30 and video encoder 20 may not require the CPB. Rather, the CPB is described as part of the HDR model for purposes of illustration only.

As above, in the second perspective for removing decoded pictures, video decoder 30 may remove the pictures from the DPB before the decoding of the current picture, but after parsing the slice header of the first slice of the current picture. Also, similar to the first perspective for removing decoded pictures, in the second perspective, video decoder 30 may perform similar functions to those described above with respect to the first perspective when the current picture is an IDR picture.

Otherwise, if the current picture is not an IDR picture, video decoder 30 may empty, without output, buffers of the DPB that store a picture that is marked as "not needed for output," that store pictures not included in the reference picture set of the current picture, and that store pictures whose temporal_id value is less than or equal to that of the current picture. Video decoder 30 may also decrement the DPB fullness by the number of buffers that video decoder 30 emptied.

When there is no empty buffer (i.e., the DPB fullness is equal to the DBP size), video decoder 30 may implement a "bumping" process described below. In some examples, when there is no empty buffer, video decoder 30 may implement the bumping process repeatedly unit there is an empty buffer in which video decoder 30 can store the current decoded picture.

When the current picture is an IDR picture for which the no_output_of_prior_pics_flag is not equal to 1, and is not inferred to be equal to 1, video decoder 30 may perform the following. Video decoder 30 may empty, without output, buffers of the DPB that store a picture that is marked as "not needed for output" and that is not included in the reference picture set of the current picture. Video decoder 30 may empty all non-empty buffers in the DPB by repeatedly invoking the "bumping" process, and may set the DPB fullness to 0.

In other words, when the current picture is an IDR picture, video decoder 30 may implement techniques to empty all buffers in the DPB. When the current picture is not an IDR picture, video decoder 30 may implement techniques to remove decoded pictures to free buffers for storing the current decoded picture.

For example, after video decoder 30 decodes the current picture, video decoder 30 may store the current picture in the DPB, and increment the DPB fullness by one. In some examples, if the OutputFlag of the current picture is equal to 1, video decoder 30 may mark the current picture as "needed for output." Otherwise, if the OutputFlag of the current picture is equal to 0, video decoder 30 may mark the current picture as "not needed for output."

As described above, in some examples, video decoder 30 may implement a bumping process. In general, the bumping process involves outputting decoded pictures. For instance, video decoder 30 may implement the bumping process for when the current picture is an IDR picture and the no_output_of_prior_pics_flag is not equal to 1, and is not inferred to be equal to 1. Video decoder 30 may also implement the bumping process if there is no empty buffer in the DPB (i.e., the DPB fullness is equal to the size of the DPB), and an empty buffer is needed for storage of a decoded (non-IDR) picture.

In general, video decoder 30 may implement the following steps to implement the bumping process. Video decoder 30 may first determine the picture to be outputted. For example, video decoder 30 may select the picture having the smallest POC value of all the pictures in the DPB that are marked as "needed for output." Video decoder 30 may crop the selected picture using the cropping rectangle specified in the active sequence parameter set for the picture. Video decoder 30 may output the cropped picture, and may mark the picture as "not needed for output." Video decoder 30 may check the buffer of the DPB that stored the cropped and outputted picture. If the picture is not included in the reference picture set and the temporal_id value of the picture is less than or equal to that of the current picture, video decoder 30 may empty that buffer and may decrement the DPB fullness by one.

By utilizing the above techniques video encoder 20 and video decoder 30 may perform random access at non-IDR RAP pictures, may reduce the amount of information that needs to be signaled for instances where long-term reference pictures may or may not be used for inter-predicting a current picture, and may ensure that reference pictures whose temporal identification value is greater than that of the current picture are available in the DPB for inter-prediction. Also, the above describes inter-predicting a picture. The following describes an example for the manner in which inter-prediction of a picture occurs.

After constructing the reference picture subsets, as described above, video decoder 30 may construct one or two reference picture lists from the reference picture subsets. A reference picture list identifies reference pictures that can be used for inter-predicting the current picture. For example, if a block in the current picture is bi-predicted (e.g., predicted with respect to two reference pictures), video decoder 30 may construct two reference pictures, referred to as List 0 and List 1 or RefPicList0 and RefPicList1. In this case, List 0 identifies one of the reference pictures, and List 1 identifies the other reference picture. If a block in the current picture is uni-directionally predicted (predicted with respect to one reference), video decoder 30 may construct one reference picture list (e.g., either List 0 or List 1) that identifies the reference picture.

In some examples, video decoder 30 may first construct an initial reference picture list or lists. If reference picture list modification is not needed, the final reference picture list or lists may be equal to the initial reference picture list or lists. If reference picture list modification is needed, video decoder 30 may implement a modification process in which video decoder 30 rearranges the ordering of the pictures I the initial reference list or lists, adds reference pictures to the list or lists, or removes reference pictures from the list or lists.

After the construction of the reference picture list or lists, video decoder 30 may receive index value(s) into the constructed reference picture list or lists. From the index value(s), video decoder 30 may determine which reference pictures to utilize for inter-prediction, may retrieve those pictures from the DPB, and perform inter-prediction with reference to those pictures.

The following describes an example manner in which video decoder 30 may construct the initial reference picture lists. This initialization process may occur when decoding a slice header of an inter-predicted picture.

To construct the initial RefPicList0, video decoder 30 may implement the following pseudo code. For example, video decoder 30 may implement the following pseudo code with decoding a P- or B-slice. In this example, there may be at least one reference picture in the RefPicSetCurr0, RefPicSetCurr1, and RefPicSetLtCurr reference picture subsets.

```
cIdx = 0
while( cIdx <= num_ref_idx_l0_active_minus1 )
{
    for( i=0; i < NumShortTermCurr0 && cIdx <=
    num_ref_idx_l0_active_minus1; cIdx++, i++ )
    {
        if (RefPicSetStCurr0[ i ] is available in the DPB)
            RefPicList0[ cIdx ] = RefPicSetStCurr0[ i ]
        else
            cIdx--;
    }
    for( i=0; i < NumShortTermCurr1 && cIdx <=
    num_ref_idx_l0_active_minus1; cIdx++, i++ )
    {
        if (RefPicSetStCurr1[ i ] is available in the DPB)
            RefPicList0[ cIdx ] = RefPicSetStCurr1[ i ]
        else
            cIdx--;
    }
    for( i=0; i < NumLongTermCurr && cIdx <=
    num_ref_idx_l0_active_minus1; cIdx++, i++ )
    {
        if (RefPicSetLtCurr[ i ] is available in the DPB)
            RefPicList0[ cIdx ] = RefPicSetLtCurr[ i ];
        else
            cIdx--;
    }
}
```

To construct the initial RefPicList1, video decoder 30 may implement the following pseudo code. For example, video decoder 30 may implement the following pseudo code with decoding a B-slice. In this example, there may be at least one reference picture in the RefPicSetCurr0, RefPicSetCurr1, and RefPicSetLtCurr reference picture subsets.

```
cIdx = 0
while( cIdx <= num_ref_idx_l1_active_minus1 )
{
    for( i=0; i < NumShortTermCurr1 && cIdx <=
    num_ref_idx_l1_active_minus1; cIdx++, i++ )
    {
        if (RefPicSetStCurr1[ i ] is available in the DPB)
            RefPicList1[ cIdx ] = RefPicSetStCurr1[ i ]
        else
            cIdx--;
    }
    for( i=0; i < NumShortTermCurr0 && cIdx <=
    num_ref_idx_l1_active_minus1; cIdx++, i++ )
    {
        if (RefPicSetStCurr0[ i ] is available in the DPB)
            RefPicList1[ cIdx ] = RefPicSetStCurr0[ i ]
        else
            cIdx--;
    }
    for( i=0; i < NumLongTermCurr && cIdx <=
    num_ref_idx_l1_active_minus1; cIdx++, i++ )
    {
        if (RefPicSetLtCurr[ i ] is available in the DPB)
            RefPicList1[ cIdx ] = RefPicSetLtCurr[ i ];
        else
            cIdx--;
    }
}
```

In the above pseudo code, the num_ref_idx_l0_active_minus1+1 indicates the number of reference pictures in RefPicList0, and num_ref_idx_l1_active_minus1+1 indicates the number of reference pictures in RefPicList1. In some examples, after reference picture list initialization, a reference picture may appear at more than one index in RefPicList0 and RefPicList1.

In some examples, reference picture list modification may be needed. In these cases, video encoder 20 may signal the ref_pic_list_modification_flag_l0 syntax element and/or the ref_pic_list_modification_flag_l1 syntax element. The ref_pic_list_modification_flag_l0 syntax element indicates that reference picture list modification of RefPicList0 is needed, and ref_pic_list_modification_flag_l1 syntax element indicates that reference picture modification of RefPicList1 is needed. When reference picture list modification is needed, video decoder 30 may include pictures in RefPicList0 and/or RefPicList1 that were not included in the initial RefPicList0 and the initial RefPicList1.

As described above, video encoder 20 may signal information that indicates which reference pictures belong to the reference picture set. There may be various ways in which video encoder 20 may signal such information. For example, in the above examples, video encoder 20 may signal the short-term reference picture set syntax and the long-term reference picture set syntax in the slice header to indicate which short-term and long-term reference pictures belong to the reference picture set.

In another example, video encoder 20 may signal a list of reference picture identification information (e.g., POC values) for short-term reference pictures and/or long-term reference pictures in the picture parameter set and/or sequence parameter set, and may signal the index to the list or a subset of the list in the slice header, which may reduce signaling overhead. In another example, video encoder 20 may signal a list of reference picture identification information (e.g., POC values) for short-term reference pictures and/or long-term reference pictures in an adaptation parameter set, either directly or by referencing the indices to the list of reference picture identification information, for short-term reference pictures and/or long-term reference pictures signaled in the picture parameter set and/or sequence parameter set, and a slice header refers to the adaptation parameter set.

The above also describes one example manner in which to construct the reference picture subsets. In some of these examples, none of the reference picture subsets may identify a picture whose temporal_id value is greater than the current picture. In some other examples, the subsets of the reference picture set may include short-term and/or long-term reference pictures that have temporal_id greater than the current picture.

Furthermore, when signaling a reference picture to be included into one or more reference picture sets, video encoder 20 may signal information of the reference picture identification and some other properties of the reference picture (e.g., temporal level information identified by temporal_id). Also, in at least one step of reference picture list constructing, including reference picture list initialization and reference picture list modification, video decoder 30 may not include reference pictures with temporal_id greater than that of the current picture in the reference picture list.

As described above, the techniques described in this disclosure may be performed in accordance with the HEVC standard. The following is a brief description of the HEVC standard to assist with understanding. Furthermore, although the techniques are described in context of the HEVC standard, the techniques may be extendable to other standards, including proprietary standards.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in decoding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes. Treeblocks may be referred to as LCUs in some examples.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
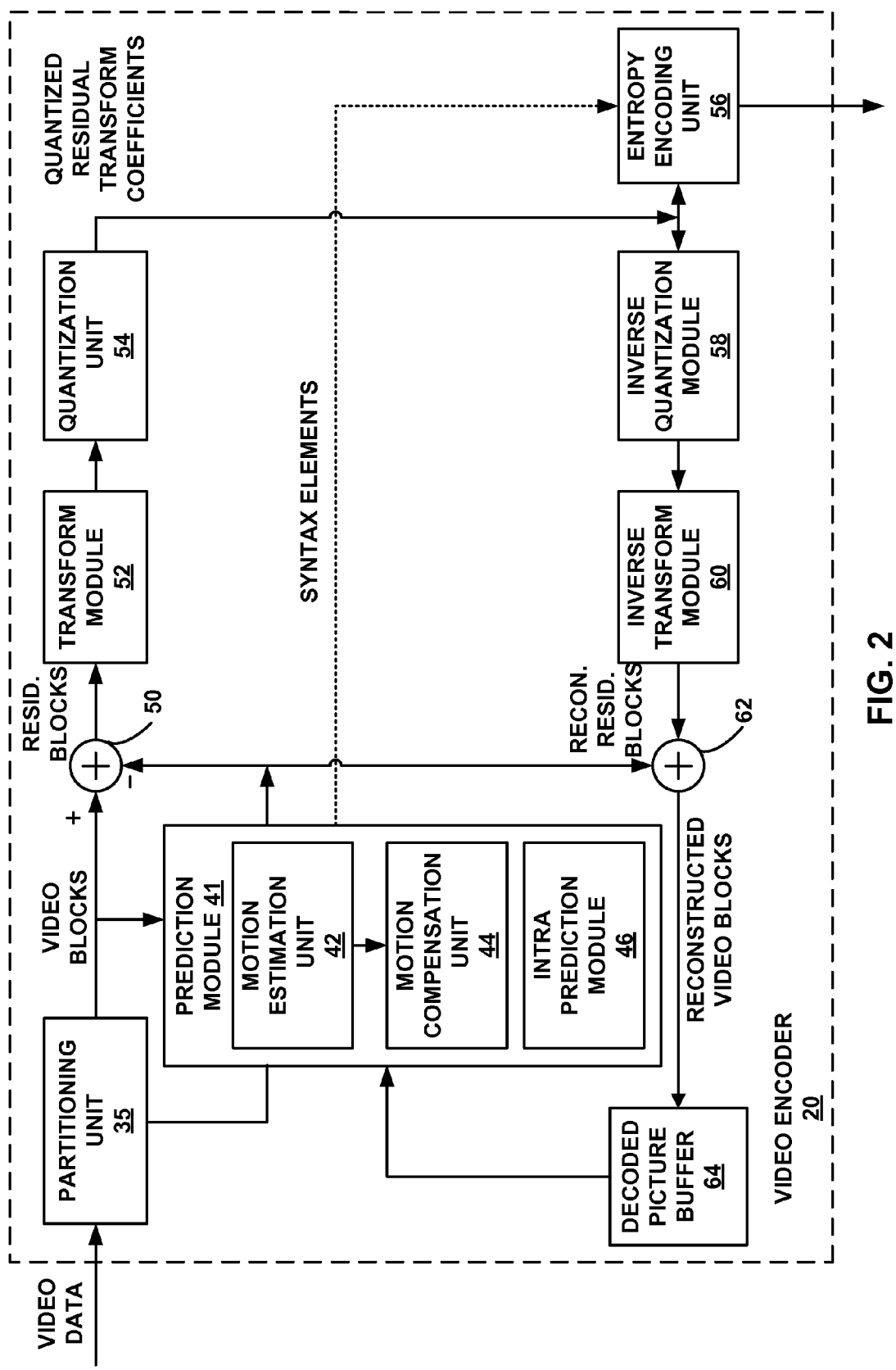
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction module 41, decoded picture buffer (DPB) 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same picture or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

After selecting an intra-prediction mode for a block, intra-prediction module 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In accordance with this disclosure, prediction module 41 represents one example unit for performing the example functions described above. For example, prediction module 41 may cause video encoder 20 to encode the full POC value for a non-IDR RAP picture which allows video decoder 30 to implement random access at a non-IDR RAP picture. As another example, prediction module 41 may cause video encoder 20 to encode the signal the syntax elements of Tables 5 and 6 based on the values of the flags. As yet another example, prediction module 41 may determine which decoded pictures can be removed from decoded picture buffer 64 based on whether the decoded pictures are needed for output, whether the decoded pictures are included in the reference picture set, and whether the temporal_id values for the decoded pictures are less than or equal to the temporal_id value of the current picture.

In other examples, a unit other than prediction module 41 may implement the examples described above. In some other examples, prediction module 41 in conjunction with one or more other units of video encoder 20 may implement the examples described above. In yet some other examples, a processor or unit of video encoder 20 (not shown in FIG. 2) may, alone or in conjunction with other units of video encoder 20, implement the examples described above.

Figure 3:
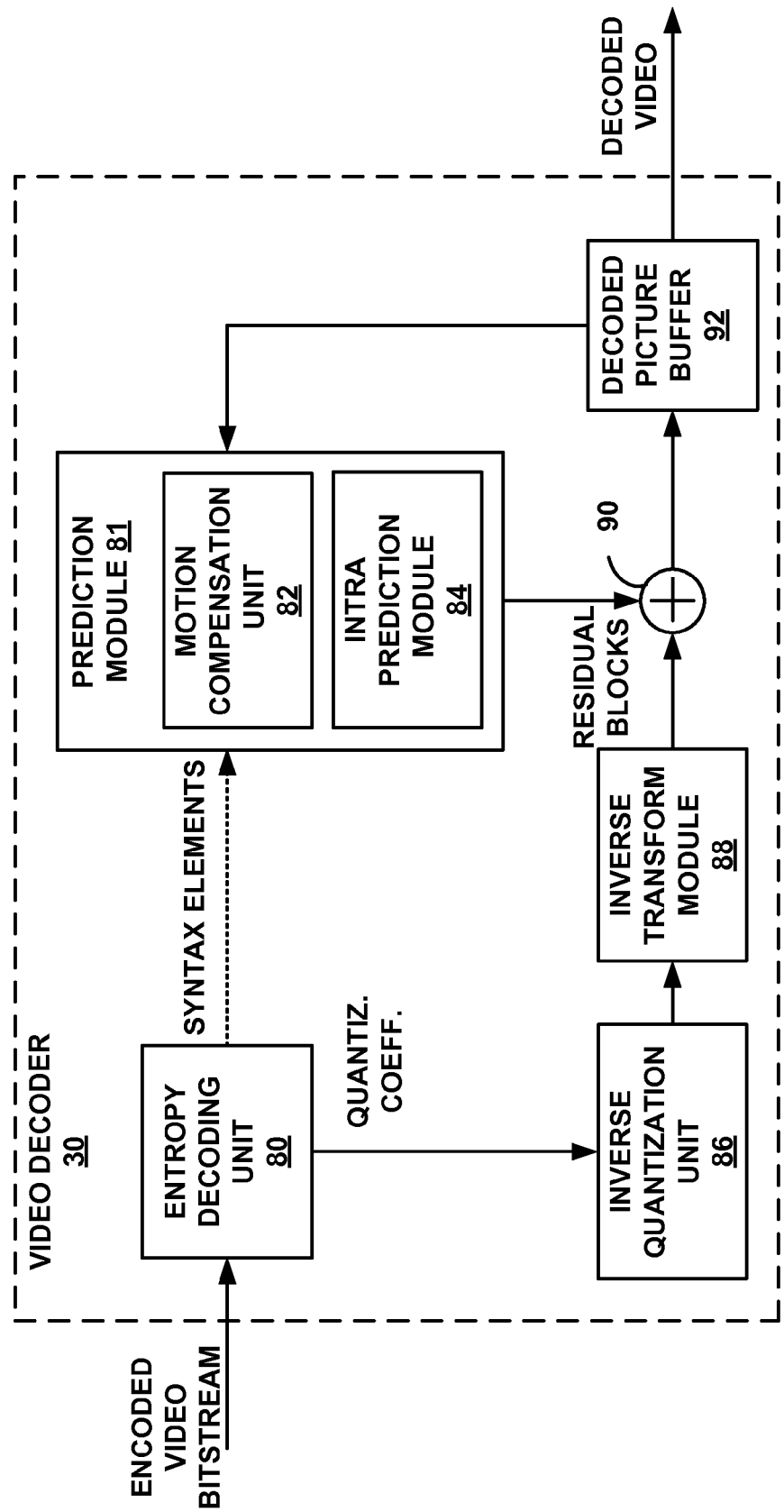
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction module 81, inverse quantization unit 86, inverse transformation unit 88, summer 90, and decoded picture buffer (DPB) 92. Prediction module 81 includes motion compensation unit 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current picture. When the video picture is coded as an inter-coded (i.e., B or P) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92. In some examples, video decoder 30 may construct List 0 and List 1 from the reference pictures identified in the derived reference picture set.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After prediction module 81 generates the predictive block for the current video block based on either inter- or intra-prediction, video decoder 30 forms a decoded video block by summing the residual blocks from inverse transform module 88 with the corresponding predictive blocks generated by prediction module 81. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in decoded picture buffer 92, which stores reference pictures used for subsequent motion compensation. Decoded picture buffer 92 also stores decoded video for later presentation on a display device, such as display device 32 of FIG. 1.

In accordance with this disclosure, prediction module 81 represents one example unit for performing the example functions described above. For example, prediction module 81 may determine the full POC values for non-RAP pictures based on full POC values of non-IDR RAP pictures, allowing video decoder 30 to perform random access at a non-IDR RAP picture. As another example, prediction module 81 may determine which long-term reference pictures can be used for inter-predicting the current picture based on the values of the flags of Tables 5 and 6. As yet another example, prediction module 81 may determine which decoded pictures can be removed from decoded picture buffer 92 based on whether the decoded pictures are needed for output, whether the decoded pictures are included in the reference picture set, and whether the temporal_id values for the decoded pictures are less than or equal to the temporal_id value of the current picture.

In other examples, a unit other than prediction module 81 may implement the examples described above. In some other examples, prediction module 81 in conjunction with one or more other units of video decoder 30 may implement the examples described above. In yet some other examples, a processor or unit of video decoder 30 (not shown in FIG. 3) may, alone or in conjunction with other units of video decoder 30, implement the examples described above.

Figure 4:
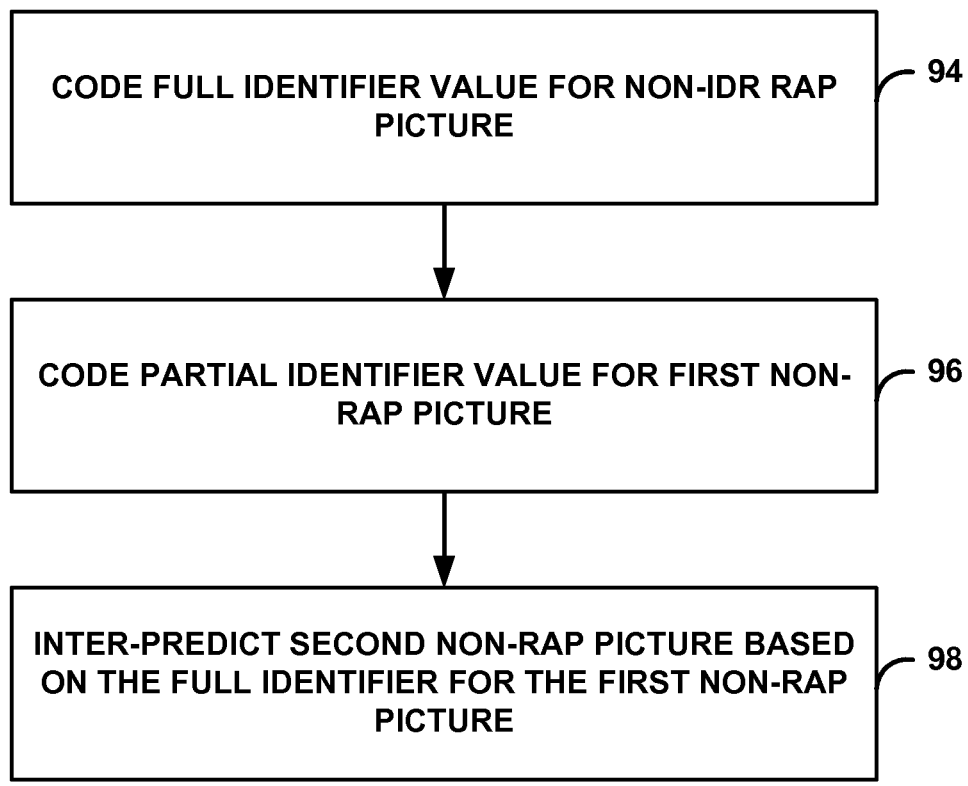
FIG. 4 is a flow chart illustrating an example operation in accordance with one or more aspects of this disclosure.

FIG. 4 is a flow chart illustrating an example operation in accordance with one or more aspects of this disclosure. For purposes of illustration only, the method of FIG. 4 may be performed by a video coder corresponding to either video encoder 20 or video decoder 30.

The video coder may code full identifier value (e.g., full POC value) for a non-IDR RAP picture (94). The video coder may code the MSB and LSB of the full POC value together, or may code the MSB and LSB of the full POC value separately. Examples of the non-IDR RAP picture include GDR, CRA, and BLA pictures.

The video coder may code a partial identifier value for a first non-RAP picture (96). The first non-RAP picture may be subsequent to the non-IDR RAP picture in decoding order. The partial identifier value may be a portion of the full POC value of the first non-RAP picture, such as the LSBs of the full POC value.

The video coder may inter-predict a second non-RAP picture based on the full identifier value of the first non-RAP picture (98). For example, the video coder may determine that the first non-RAP picture is going to be used for inter-predicting the second non-RAP picture based on the full identifier value of the first non-RAP picture. The second non-RAP picture may be subsequent to the first non-RAP picture in decoding order.

Figure 5:
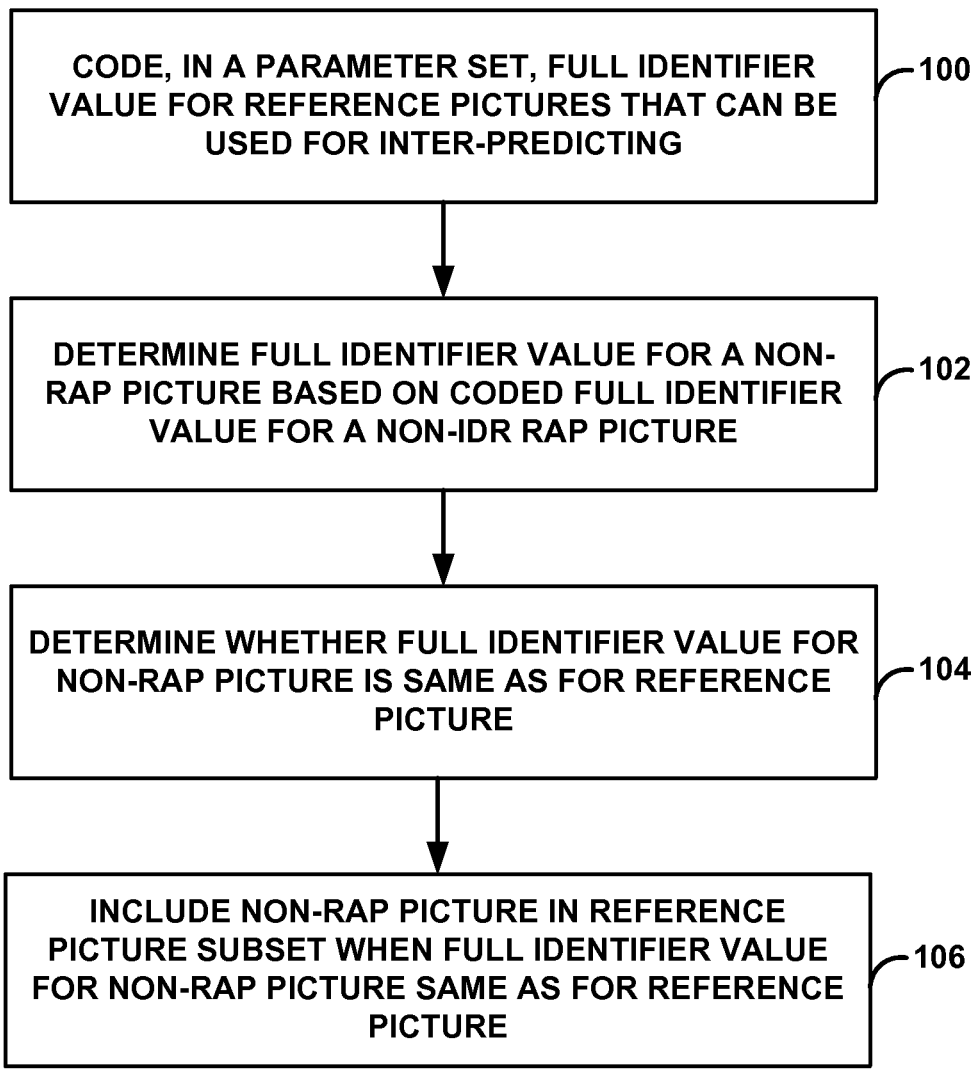
FIG. 5 is a flow chart illustrating another example operation in accordance with one or more aspects of this disclosure.

FIG. 5 is a flow chart illustrating another example operation in accordance with one or more aspects of this disclosure. For purposes of illustration only, the method of FIG. 5 may be performed by a video coder corresponding to a video coder such as video decoder 30. A video coder may code a full identifier value for a reference picture that can be used for inter-predicting (100). For example, the video coder may code full POC values for long-term reference picture that can be used inter-predicting in a parameter set, such as the picture parameter set.

In some examples, the video coder may only receive partial identifier values for non-RAP pictures and full identifier values for non-IDR RAP pictures. In these examples, the video coder may determine full identifier value for a non-RAP picture based on the full identifier value for a non-IDR RAP picture and a partial identifier value for the non-RAP picture (102). The video coder may determine whether the full identifier value for the non-RAP picture is the same as for the reference picture (104). When they are the same, the video coder may include the non-RAP picture in a reference picture subset (106).

Figure 6:
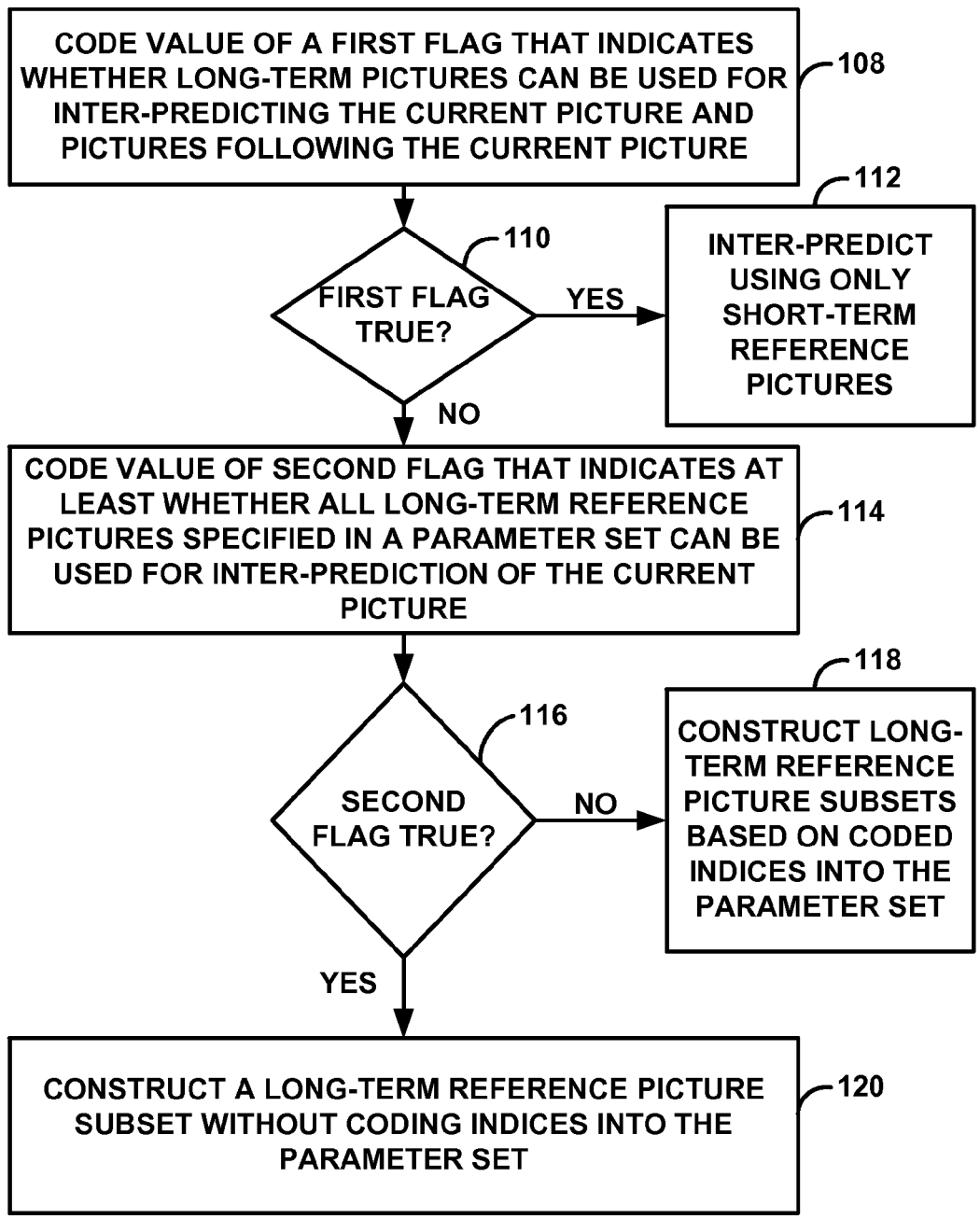
FIG. 6 is a flow chart illustrating another example operation in accordance with one or more aspects of this disclosure.

FIG. 6 is a flow chart illustrating another example operation in accordance with one or more aspects of this disclosure. For purposes of illustration only, the method of FIG. 6 may be performed by a video coder corresponding to either video encoder 20 or video decoder 30.

The video coder may code a value for a first flag (e.g., the long_term_not_used_flag) that indicates whether long-term pictures can be used for inter-predicting the current picture and pictures following the current picture in decoding order (108). The video coder may determine whether the first flag is true (110).

When true ("YES" of 110), the video coder may inter-predicting the current picture using only short-term reference pictures (112). When false ("NO" of 110), code value of second flag (e.g., long_term_reuse_pps_flag) that indicates whether all long-term reference pictures specified in the parameter set can be used for prediction of the current picture, and whether long-term reference pictures that are not indicated in the parameter set and that are prior to the current picture in decoding order can be used for inter prediction of the current picture or pictures following the current picture in decoding order.

The video coder may determine whether the second flag is true (116). When false ("NO" of 116), the video coder may construct long-term reference picture subsets based on coded indices into the parameter set for the specified long-term reference pictures (e.g., indices into the list of candidate long-term reference pictures specified in the parameter set) (118). When true ("YES" of 116), the video coder may construct a long-term reference picture subset without coding indices into the parameter set (e.g., without coding indices into the list of candidate long-term reference pictures specified in the parameter set) (120).

Figure 7:
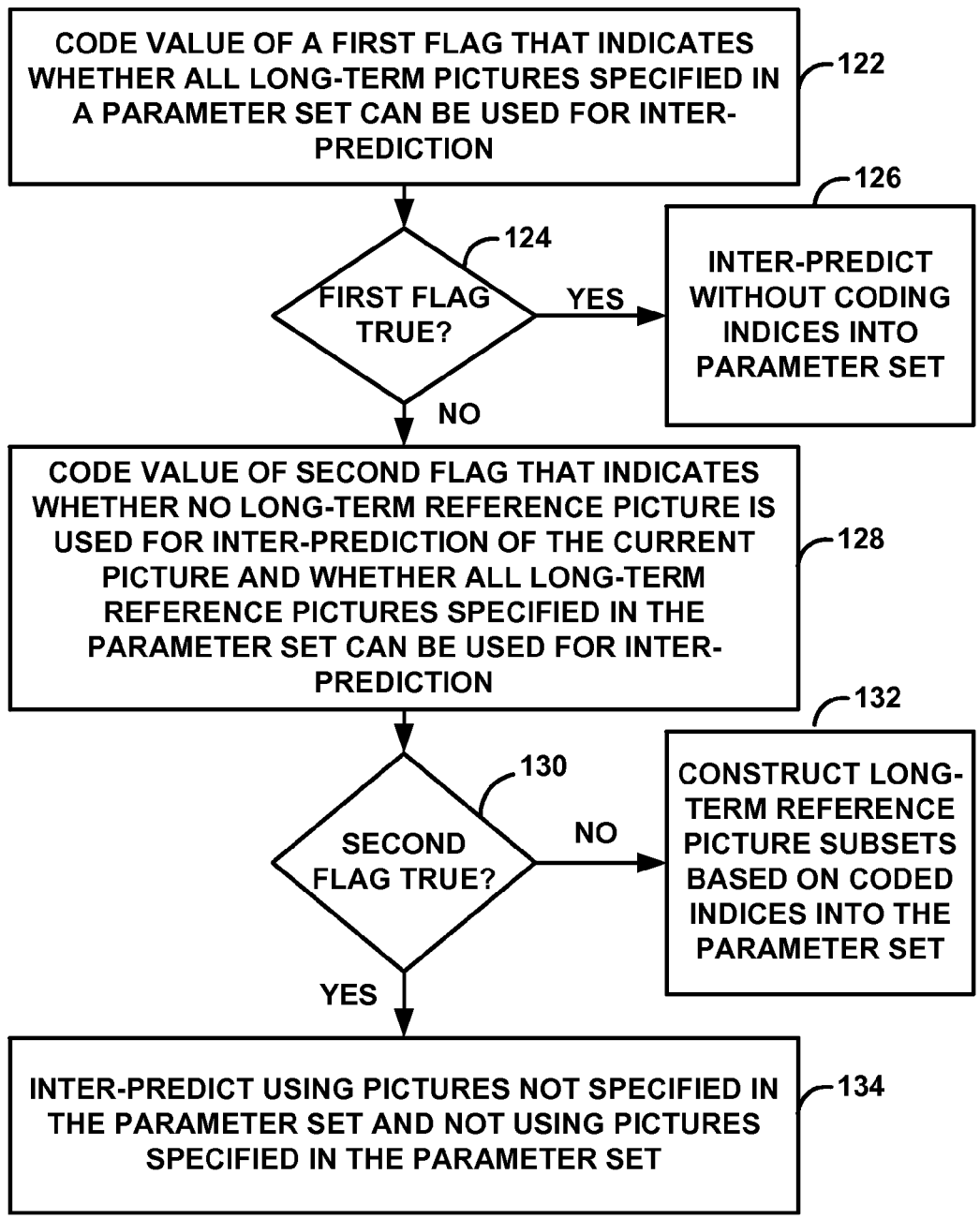
FIG. 7 is a flow chart illustrating another example operation in accordance with one or more aspects of this disclosure.

FIG. 7 is a flow chart illustrating another example operation in accordance with one or more aspects of this disclosure. For purposes of illustration only, the method of FIG. 7 may be performed by a video coder corresponding to either video encoder 20 or video decoder 30.

The video coder may code a value of a first flag (e.g., the long_term_pps_curr_flag) that indicates whether all long-term pictures specified in the parameter set can be used for inter-prediction of the current picture (122). The video coder may determine whether the first flag is true (124).

When true ("YES" of 124), the video coder may inter-predict the current picture without coding indices into the parameter set for the specified long-term reference pictures (126). When false ("NO" of 124), the video coder may code a value of a second flag (e.g., the long_term_pps_foll_flag) that indicates whether no long-term reference pictures is used for inter-prediction of the current picture and whether all long-term reference pictures specified in the parameter set can be used for inter-prediction (128).

The video coder may determine whether the second flag is true (130). When false ("NO" of 130), the video coder may construct long-term reference picture subsets based on coded indices into the parameter set (132). When true ("YES" of 130), the video coder may inter-predict using pictures not specified in the parameter set and not using pictures specified in the parameter set (134).

Figure 8:
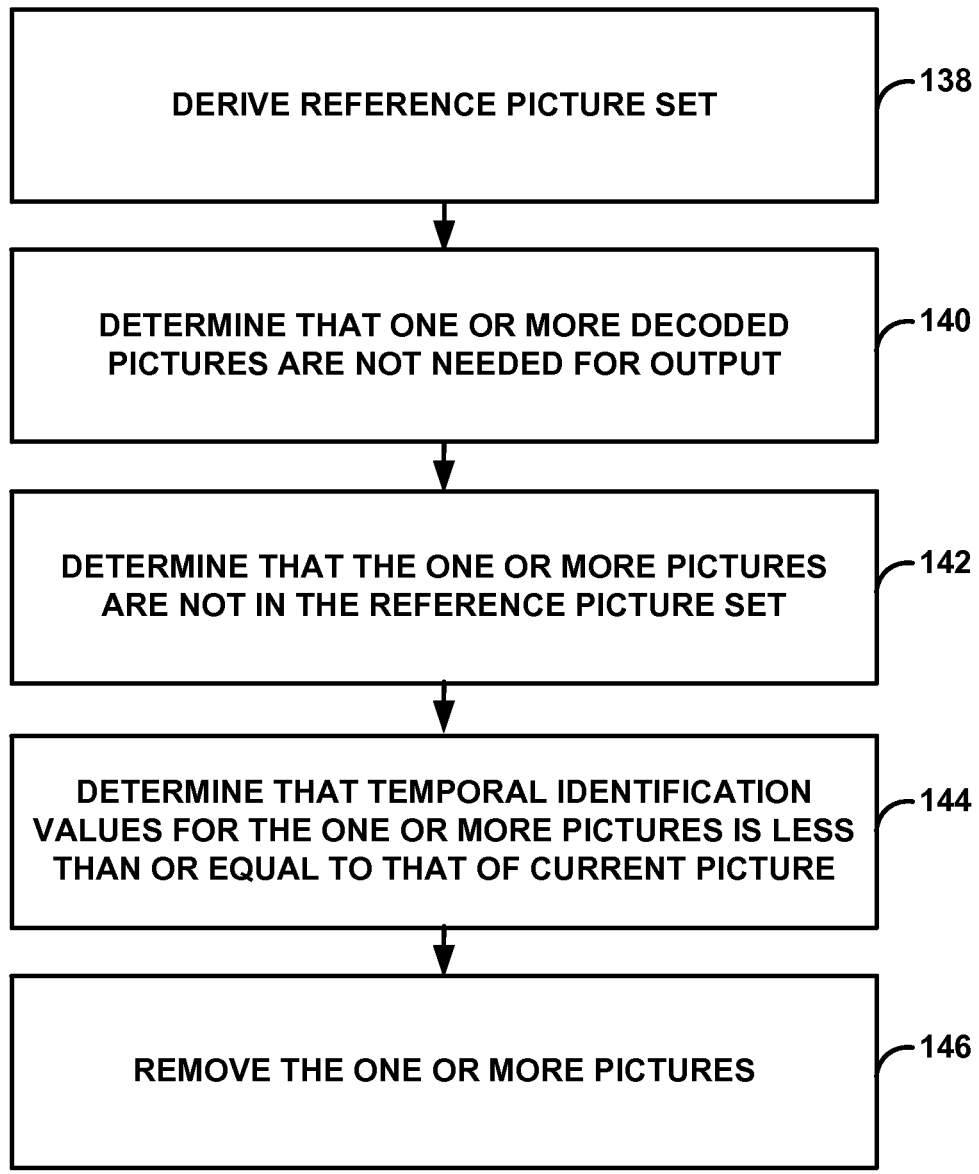
FIG. 8 is a flow chart illustrating another example operation in accordance with one or more aspects of this disclosure.

FIG. 8 is a flow chart illustrating another example operation in accordance with one or more aspects of this disclosure. For purposes of illustration only, the method of FIG. 8 may be performed by a video coder corresponding to either video encoder 20 or video decoder 30.

The video coder may derive a reference picture set for the current picture (138). The video coder may determine that one or more decoded pictures stored in a DPB are not needed for output (140), that the one or more decoded pictures are not in the reference picture set (142, and that the temporal identification (temporal_id) values for the one or more pictures is less than or equal to the temporal_id of the current picture (144). In this case, the video coder may remove the one or more pictures from the DPB (146).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
    coding, in a slice header of a slice of the video data, a full identifier value for a random access point (RAP) picture of the video data that is not an instantaneous decoder refresh (IDR) picture, wherein the full identifier value comprises a full picture order count (POC) value for the RAP picture;
    determining a partial identifier value for a first non-RAP picture of the video data based on the full identifier value for the RAP picture;
    determining a full identifier value for the first non-RAP picture, wherein the partial identifier value represents a portion of the full identifier value for the first non-RAP picture;
    identifying the first non-RAP picture as a reference picture for a second non-RAP picture of the video data based on the full identifier value for the first non-RAP picture; and
    inter-predicting the second non-RAP picture based on the first non-RAP picture.

2. The method of claim 1, further comprising:
    for non-RAP pictures following the RAP picture in decoding order, identifying reference pictures that can be used for inter-predicting the non-RAP pictures based on the full identifier value of the RAP picture.

3. The method of claim 1, wherein coding the full identifier value comprises separately coding a most significant bit (MSB) portion of the full POC value for the RAP picture and a least signification bit (LSB) portion of the full POC value for the RAP picture.

4. The method of claim 1, wherein the RAP picture comprises one of a clean random access (CRA) picture, a broken link access (BLA) picture, and a gradual decoding refresh (GDR) picture.

5. The method of claim 1, further comprising:
    coding a value of a flag, in the slice header for a current picture,
    wherein when the value of the flag is a first value, no long-term reference picture can be used for inter-prediction of the current picture and no long-term reference picture can be used for inter-prediction of pictures following the current picture in decoding order, and
    wherein when the value of the flag is a second value, one or more long-term reference pictures can be used for inter-prediction of the current picture and can be used for inter-prediction of the pictures following the current picture in decoding order.

6. The method of claim 1, further comprising:
    coding a value of a flag, in the slice header for a current picture,
    wherein when the value of the flag is a first value, all long-term reference pictures specified in a parameter set can be used for inter-prediction of the current picture, and long-term reference pictures that are not specified in the parameter set and that are prior to the current picture in decoding order cannot be used for inter-prediction of the current picture and pictures following the current picture in decoding order, and
    wherein when the value of the flag is a second value, not all of the long-term reference pictures specified in a parameter set can be used for inter-prediction of the current picture, and long-term reference pictures that are not specified in the parameter set and that are prior to the current picture in decoding order can be used for inter-prediction of the current picture and pictures following the current picture in decoding order.

7. The method of claim 6, wherein, when the value of the flag is the first value, the method further comprising:
constructing a long-term reference picture subset of a reference picture set without coding indices into the parameter set that identify long-term reference pictures specified in the parameter set,
wherein constructing the long-term reference picture subset comprises including all of the long-term reference pictures specified in the parameter set in the reference picture subset.

8. The method of claim 1, further comprising:
coding a value of a flag, in the slice header for a current picture,
wherein when the value of the flag is a first value, all long-term reference pictures specified in a parameter set can be used for inter-prediction of the current picture, and
wherein when the value of the flag is a second value, not all of the long-term reference pictures specified in the parameter set can be used for inter-prediction of the current picture.

9. The method of claim 1, further comprising:
coding a value of a flag, in the slice header for a current picture,
wherein when the value of the flag is a first value, no long-term reference picture can be used for inter-prediction of the current picture, and all long-term reference pictures specified in a parameter set can be used for inter-prediction of pictures following the current picture in decoding order, and
wherein when the value of the flag is a second value, one or more of the long-term reference pictures can be used for inter-prediction of the current picture, and not all of the long-term reference pictures specified in the parameter set can be used for inter-prediction of pictures following the current picture in decoding order.

10. The method of claim 1, further comprising:
deriving a reference picture set for a current picture;
determining a temporal identification value of a current picture; and
removing one or more pictures from a decoded picture buffer (DPB) having temporal identification values less than or equal to the temporal identification value of the current picture and that are not identified in the reference picture set,
wherein the current picture can be inter-predicted with reference to one or more pictures identified in the reference picture set whose temporal identification values are less than or equal to the temporal identification value of the current picture.

11. The method of claim 10, further comprising:
determining that the one or more pictures are not needed for output,
wherein removing the one or more pictures comprises removing the one or more pictures from DPB having temporal identification values less than or equal to the temporal identification value of the current picture, that are not identified in the reference picture set, and that are not needed for output.

12. The method of claim 10, wherein removing the one or more pictures comprises removing the one or more picture prior to inter-predicting the current picture.

13. A device for coding video data, the device comprising:
a decoded picture buffer (DPB); and
a video coder configured to:
code, in a slice header of a slice of the video data, a full identifier value for a random access point (RAP) picture of the video data that is not an instantaneous decoder refresh (IDR) picture, wherein the full identifier value comprises a full picture order count (POC) value for the RAP picture;
determine a partial identifier value for a first non-RAP picture of the video data based on the full identifier value for the RAP picture;
determine a full identifier value for the first non-RAP picture, wherein the partial identifier value represents a portion of full identifier value for the first non-RAP picture;
identify the first non-RAP picture as a reference picture for a second non-RAP picture of the video data based on the full identifier value for the first non-RAP picture; and
inter-predict the second non-RAP picture based on the first non-RAP picture.

14. The device of claim 13, wherein, for non-RAP pictures following the RAP picture in decoding order, the video coder is configured to:
identify reference pictures that can be used for inter-predicting the non-RAP pictures based on the full identifier value of the RAP picture.

15. The device of claim 13, wherein, to code the full identifier value, the video coder is configured to code a most significant bit (MSB) portion of the full POC value for the RAP picture and a least signification bit (LSB) portion of the full POC value for the RAP picture.

16. The device of claim 13, wherein the RAP picture comprises one of a clean random access (CRA) picture, a broken link access (BLA) picture, and a gradual decoding refresh (GDR) picture.

17. The device of claim 13, wherein the video coder is configured to:
code a value of a flag, in the slice header for a current picture,
wherein when the value of the flag is a first value, no long-term reference picture can be used for inter-prediction of the current picture and no long-term reference picture can be used for inter-prediction of pictures following the current picture in decoding order, and
wherein when the value of the flag is a second value, one or more long-term reference pictures can be used for inter-prediction of the current picture and can be used for inter-prediction of the pictures following the current picture in decoding order.

18. The device of claim 13, wherein the video coder is configured to:
code a value of a flag, in the slice header for a current picture,
wherein when the value of the flag is a first value, all long-term reference pictures specified in a parameter set can be used for inter-prediction of the current picture, and long-term reference pictures that are not specified in the parameter set and that are prior to the current picture in decoding order cannot be used for inter-prediction of the current picture and pictures following the current picture in decoding order, and
wherein when the value of the flag is a second value, not all of the long-term reference pictures specified in a parameter set can be used for inter-prediction of the current picture, and long-term reference pictures that are not specified in the parameter set and that are prior to the current picture in decoding order can be used for inter-prediction of the current picture and pictures following the current picture in decoding order.

19. The device of claim 18, wherein, when the value of the flag is the first value, the video coder is configured to:
construct a long-term reference picture subset of a reference picture set without coding indices into the parameter set that identify long-term reference pictures specified in the parameter set,
wherein, to construct, the long-term reference picture subset, the video coder is configured to include all of the long-term reference pictures specified in the parameter set in the reference picture subset.

20. The device of claim 13, wherein the video coder is configured to:
code a value of a flag, in the slice header for a current picture,
wherein when the value of the flag is a first value, all long-term reference pictures specified in a parameter set can be used for inter-prediction of the current picture, and
wherein when the value of the flag is a second value, not all of the long-term reference pictures specified in the parameter set can be used for inter-prediction of the current picture.

21. The device of claim 13, wherein the video coder is configured to:
code a value of a flag, in the slice header for a current picture,
wherein when the value of the flag is a first value, no long-term reference picture can be used for inter-prediction of the current picture, and all long-term reference pictures specified in a parameter set can be used for inter-prediction of pictures following the current picture in decoding order, and
wherein when the value of the flag is a second value, one or more of the long-term reference pictures can be used for inter-prediction of the current picture, and not all of the long-term reference pictures specified in the parameter set can be used for inter-prediction of pictures following the current picture in decoding order.

22. The device of claim 13, wherein the video coder is configured to:
derive a reference picture set for a current picture;
determine a temporal identification value of a current picture; and
remove one or more pictures from the DPB having temporal identification values less than or equal to the temporal identification value of the current picture and that are not identified in the reference picture set,
wherein the current picture can be inter-predicted with reference to one or more pictures identified in the reference picture set whose temporal identification values are less than or equal to the temporal identification value of the current picture.

23. The device of claim 22, wherein the video coder is configured to:
determine that the one or more pictures are not needed for output,
wherein the video coder is configured to remove the one or more pictures from DPB having temporal identification values less than or equal to the temporal identification value of the current picture, that are not identified in the reference picture set, and that are not needed for output.

24. The device of claim 22, wherein, to remove the one or more pictures, the video coder is configured to remove the one or more pictures prior to inter-predicting the current picture.

25. The device of claim 13, wherein the video coder comprises a video decoder, and wherein to determine the full identifier value for the first non-RAP picture, the video decoder is configured to determine the full identifier value for the first non-RAP picture based on the partial identifier value for the first non-RAP picture.

26. The device of claim 13, wherein the video coder comprises a video encoder.

27. The device of claim 13, wherein the device comprises one of:
a wireless communication device;
a microprocessor; or
an integrated circuit.

28. A non-transitory computer-readable storage medium having stored thereon instructions that, when executed, cause a processor of a device for coding video data to:
code, in a slice header of a slice of the video data, a full identifier value for a random access point (RAP) picture that is not an instantaneous decoder refresh (IDR) picture, wherein the full identifier value comprises a full picture order count (POC) value for the RAP picture;
determine a partial identifier value for a first non-RAP picture of the video data based on the full identifier value for the RAP picture;
determine a full identifier value for the first non-RAP picture, wherein the partial identifier value represents a portion of the full identifier value for the non-RAP picture;
identify the first non-RAP picture as a reference picture for a second non-RAP picture of the video data based on the full identifier value for the first non-RAP picture; and
inter-predict the second non-RAP picture based on the first non-RAP picture.

29. The non-transitory computer-readable storage medium of claim 28, further comprising instructions that cause the processor to:
code a value of a flag, in the slice header for a current picture,
wherein when the value of the flag is a first value, no long-term reference picture can be used for inter-prediction of the current picture and no long-term reference picture can be used for inter-prediction of pictures following the current picture in decoding order, and
wherein when the value of the flag is a second value, one or more long-term reference pictures can be used for inter-prediction of the current picture and can be used for inter-prediction of the pictures following the current picture in decoding order.

30. The non-transitory computer-readable storage medium of claim 28, further comprising instructions that cause the processor to:
code a value of a flag, in the slice header for a current picture,
wherein when the value of the flag is a first value, all long-term reference pictures specified in a parameter set can be used for inter-prediction of the current picture, and long-term reference pictures that are not specified in the parameter set and that are prior to the current picture in decoding order cannot be used for inter-prediction of the current picture and pictures following the current picture in decoding order, and wherein when the value of the flag is a second value, not all of the long-term reference pictures specified in a parameter set can be used for inter-prediction of the current picture, and long-term reference pictures that are not specified in the parameter set and that are prior to the current picture in decoding order can be used for inter-prediction of the current picture and pictures following the current picture in decoding order.

31. The non-transitory computer-readable storage medium of claim 28, further comprising instructions that cause the processor to:

code a value of a flag, in the slice header for a current picture, wherein when the value of the flag is a first value, all long-term reference pictures specified in a parameter set can be used for inter-prediction of the current picture, and wherein when the value of the flag is a second value, not all of the long-term reference pictures specified in the parameter set can be used for inter-prediction of the current picture.

32. The non-transitory computer-readable storage medium of claim 28, further comprising instructions that cause the processor to:

code a value of a flag, in the slice header for a current picture, wherein when the value of the flag is a first value, no long-term reference picture can be used for inter-prediction of the current picture, and all long-term reference pictures specified in a parameter set can be used for inter-prediction of pictures following the current picture in decoding order, and wherein when the value of the flag is a second value, one or more of the long-term reference pictures can be used for inter-prediction of the current picture, and not all of the long-term reference pictures specified in the parameter set can be used for inter-prediction of pictures following the current picture in decoding order.

33. The non-transitory computer-readable storage medium of claim 28, further comprising instructions that cause the processor to:

derive a reference picture set for a current picture;

determine a temporal identification value of a current picture; and remove one or more pictures from a decoded picture buffer (DPB) having temporal identification values less than or equal to the temporal identification value of the current picture and that are not identified in the reference picture set, wherein the current picture can be inter-predicted with reference to one or more pictures identified in the reference picture set whose temporal identification values are less than or equal to the temporal identification value of the current picture.

34. A device for coding video data, the device comprising:

means for coding, in a slice header of a slice of the video data, a full identifier value for a random access point (RAP) picture that is not an instantaneous decoder refresh (IDR) picture, wherein the full identifier value comprises a full picture order count (POC) value for the RAP picture;

means for determining a partial identifier value for a first non-RAP picture of the video data based on the full identifier value for the RAP picture;

means for determining a full identifier value for the first non-RAP picture, wherein the partial identifier value represents a portion of the full identifier value for the non-RAP picture;

means for identifying the first non-RAP picture as a reference picture for a second non-RAP picture of the video data based on the full identifier value for the first non-RAP picture; and means for inter-predicting the second non-RAP picture based on the first non-RAP picture.

35. The device of claim 34, further comprising:

means for coding a value of a flag, in the slice header for a current picture, wherein when the value of the flag is a first value, no long-term reference picture can be used for inter-prediction of the current picture and no long-term reference picture can be used for inter-prediction of pictures following the current picture in decoding order, and wherein when the value of the flag is a second value, one or more long-term reference pictures can be used for inter-prediction of the current picture and can be used for inter-prediction of the pictures following the current picture in decoding order.

36. The device of claim 34, further comprising:

means for coding a value of a flag, in the slice header for a current picture, wherein when the value of the flag is a first value, all long-term reference pictures specified in a parameter set can be used for inter-prediction of the current picture, and long-term reference pictures that are not specified in the parameter set and that are prior to the current picture in decoding order cannot be used for inter-prediction of the current picture and pictures following the current picture in decoding order, and wherein when the value of the flag is a second value, not all of the long-term reference pictures specified in a parameter set can be used for inter-prediction of the current picture, and long-term reference pictures that are not specified in the parameter set and that are prior to the current picture in decoding order can be used for inter-prediction of the current picture and pictures following the current picture in decoding order.

37. The device of claim 34, further comprising:

means for coding a value of a flag, in the slice header for a current picture, wherein when the value of the flag is a first value, all long-term reference pictures specified in a parameter set can be used for inter-prediction of the current picture, and wherein when the value of the flag is a second value, not all of the long-term reference pictures specified in the parameter set can be used for inter-prediction of the current picture.

38. The device of claim 34, further comprising:

means for coding a value of a flag, in the slice header for a current picture, wherein when the value of the flag is a first value, no long-term reference picture can be used for inter-prediction of the current picture, and all long-term reference pictures specified in a parameter set can be used for inter-prediction of pictures following the current picture in decoding order, and wherein when the value of the flag is a second value, one or more of the long-term reference pictures can be used for inter-prediction of the current picture, and not all of the long-term reference pictures specified in the parameter set can be used for inter-prediction of pictures following the current picture in decoding order.

39. The device of claim 34, further comprising:
means for deriving a reference picture set for a current picture;
means for determining a temporal identification value of a current picture; and
means for removing one or more pictures from a decoded picture buffer (DPB) having temporal identification values less than or equal to the temporal identification value of the current picture and that are not identified in the reference picture set,
wherein the current picture can be inter-predicted with reference to one or more pictures identified in the reference picture set whose temporal identification values are less than or equal to the temporal identification value of the current picture.

* * * * *

UNITED STATES PATENT AND TRADEMARK OFFICE
CERTIFICATE OF CORRECTION

PATENT NO. : 9,998,757 B2
APPLICATION NO. : 13/623768
DATED : June 12, 2018
INVENTOR(S) : Chen et al.

Page 1 of 1

It is certified that error appears in the above-identified patent and that said Letters Patent is hereby corrected as shown below:

In the Specification

Column 12, Line 3, "evey" should read --evry--.

Column 20, Line 20, "pie order_cnt_lsb" should read --pic_order_cnt_lsb--.

Column 20, Lines 34-35, delete the second instance of "MaxPicOrderCntLsb=".

Column 23, Line 47, "37 if" should read --"if--.

Signed and Sealed this
Twenty-seventh Day of November, 2018

Andrei Iancu
*Director of the United States Patent and Trademark Office*